US012645232B2

(12) United States Patent
Beck et al.

(10) Patent No.: US 12,645,232 B2
(45) Date of Patent: Jun. 2, 2026

(54) AERIAL LIFT SYSTEMS AND CONTROL INPUT APPARATUSES WITH HIGH ELECTRICAL RESISTANCE FOR USE WITH AERIAL LIFT SYSTEMS

(71) Applicant: Altec Industries, Inc., Birmingham, AL (US)

(72) Inventors: Aaron B. Beck, Kansas City, MO (US); Andrew W. Featherstone, Country Club, MO (US); David Fuller, Forest City, MO (US); Jesse Thompson, Shepherdsville, KY (US)

(73) Assignee: Altec Industries, Inc., Birmingham, AL (US)

( * ) Notice: Subject to any disclaimer, the term of this patent is extended or adjusted under 35 U.S.C. 154(b) by 297 days.

(21) Appl. No.: 18/380,841

(22) Filed: Oct. 17, 2023

(65) Prior Publication Data

US 2024/0255968 A1 Aug. 1, 2024

Related U.S. Application Data

(63) Continuation of application No. 18/102,958, filed on Jan. 30, 2023, now Pat. No. 11,822,356.

(51) Int. Cl.
*G05D 3/10* (2006.01)
*B66F 17/00* (2006.01)
(52) U.S. Cl.
CPC ............. *G05D 3/10* (2013.01); *B66F 17/006* (2013.01)

(58) Field of Classification Search
CPC .................... G05D 3/125; G05D 3/12; G05B 2219/25272; G05B 2219/37094; G05B 2219/37274; G05B 2219/35438; B66F 17/006
See application file for complete search history.

(56) References Cited

U.S. PATENT DOCUMENTS

2011/0148667 A1* 6/2011 Yeh ........................ G05G 9/047
341/20
2017/0334698 A1* 11/2017 Beck ..................... B66F 17/006
2018/0337674 A1* 11/2018 Rasmussen ............ G05G 25/00

FOREIGN PATENT DOCUMENTS

EP 0285710 A1 * 10/1988 ............ B66F 17/006

* cited by examiner

*Primary Examiner* — Schyler S Sanks
(74) *Attorney, Agent, or Firm* — Erise IP, P.A.

(57) ABSTRACT

A control input apparatus for operating an aerial lift system includes a control lever assembly that has at least one control lever and at least one position sensor. The at least one position sensor may indicate a position and/or a movement of the at least one control lever. The control input apparatus additionally incudes a control input element actuatable over a movement range from a non-actuated position to a fully-actuated position, and at least one interlock sensor that releases an interlock corresponding to the control lever assembly upon the control input element being actuated at least to an actuation threshold position located between the non-actuated position and the fully-actuated position. Upon the control input element being actuated at least to the actuation threshold position, the control input apparatus provides control inputs corresponding to the position and/or the movement of the control lever indicated by the at least one position sensor.

20 Claims, 19 Drawing Sheets

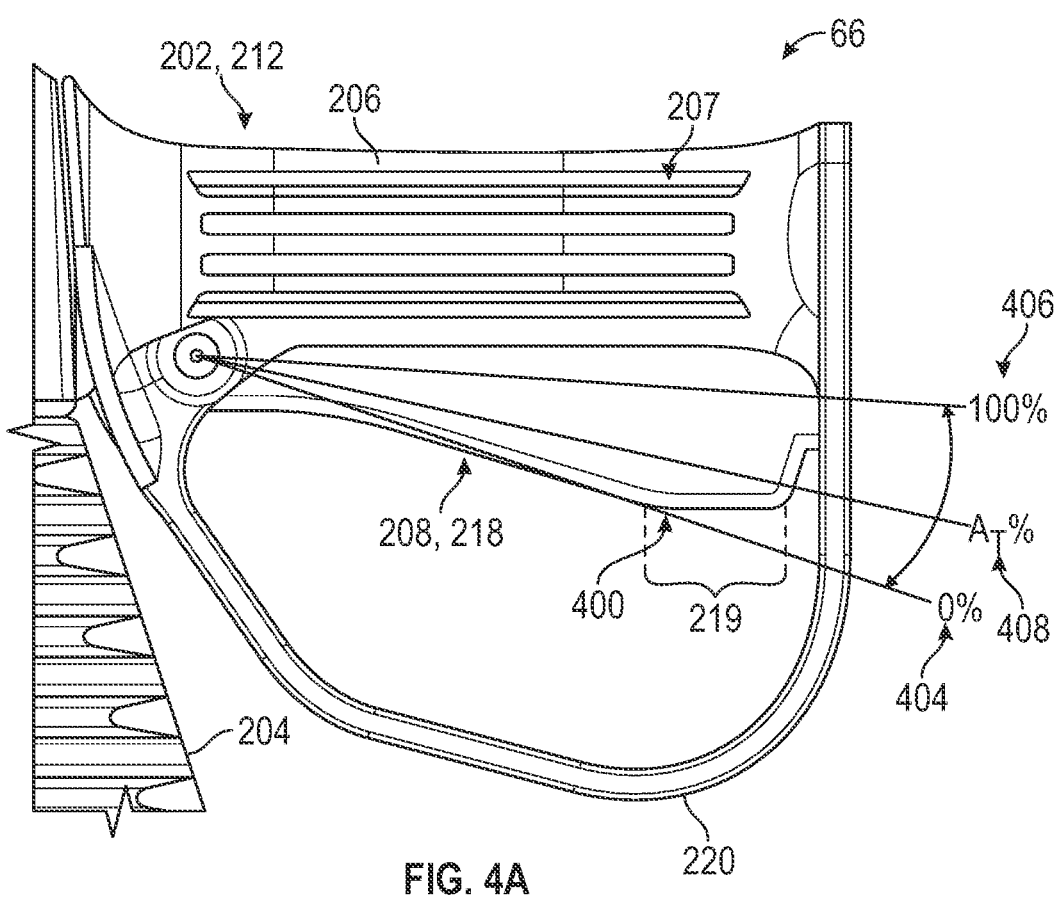
FIG. 4A
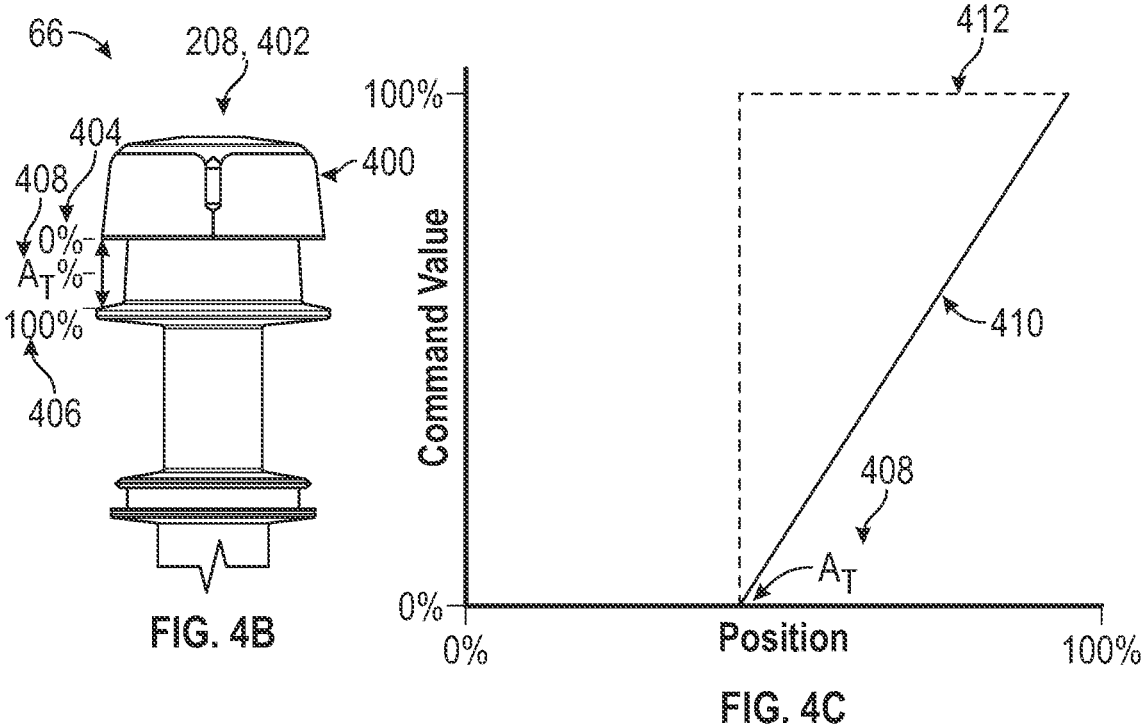
FIG. 4B
FIG. 4C

600

Position

First Reference Axis (A₁) 214

X-Axis 628
Z-Axis 630

Position

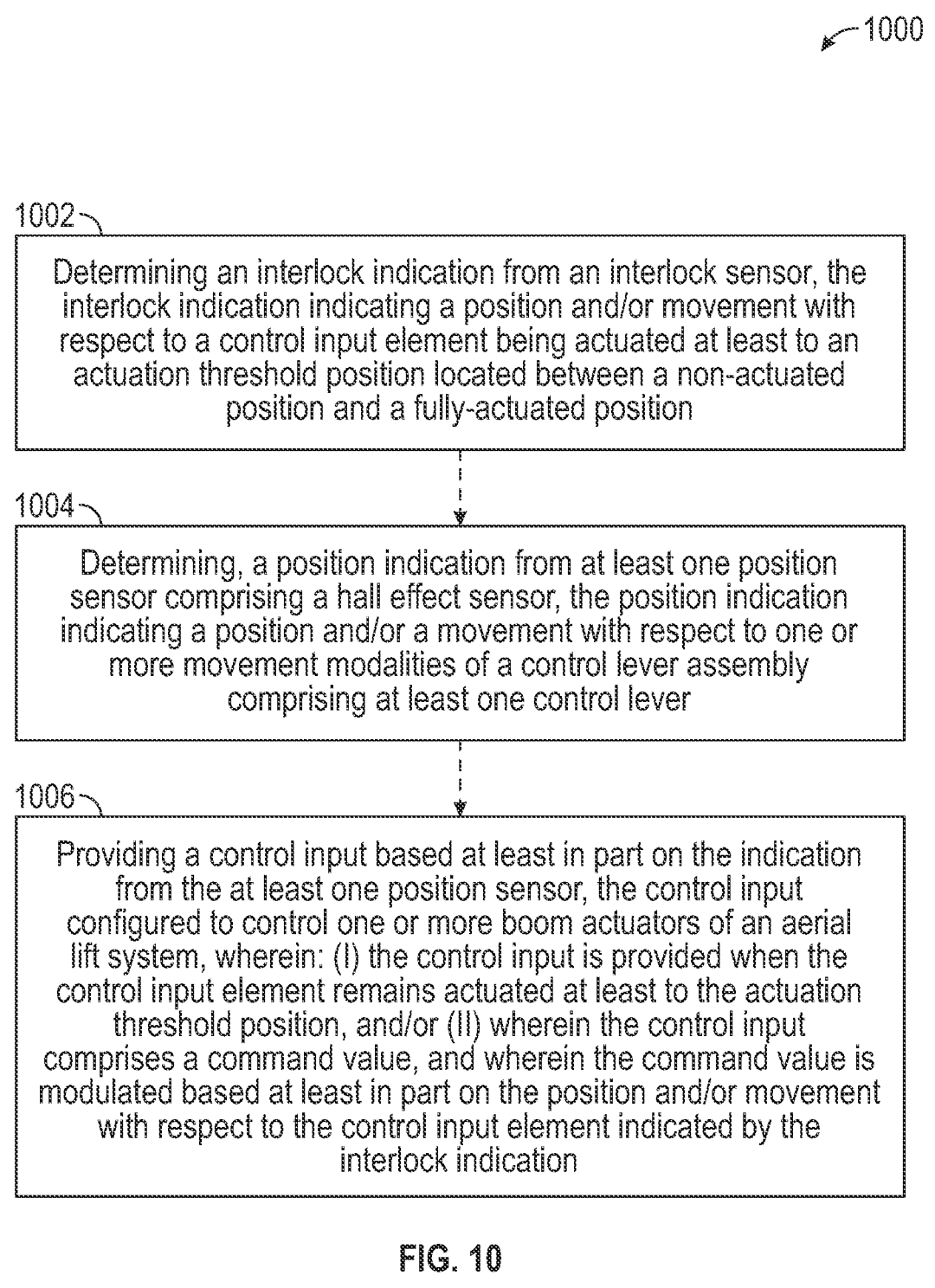

1000

1002

Determining an interlock indication from an interlock sensor, the interlock indication indicating a position and/or movement with respect to a control input element being actuated at least to an actuation threshold position located between a non-actuated position and a fully-actuated position

1004

Determining, a position indication from at least one position sensor comprising a hall effect sensor, the position indication indicating a position and/or a movement with respect to one or more movement modalities of a control lever assembly comprising at least one control lever

1006

Providing a control input based at least in part on the indication from the at least one position sensor, the control input configured to control one or more boom actuators of an aerial lift system, wherein: (I) the control input is provided when the control input element remains actuated at least to the actuation threshold position, and/or (II) wherein the control input comprises a command value, and wherein the command value is modulated based at least in part on the position and/or movement with respect to the control input element indicated by the interlock indication

FIG. 10

AERIAL LIFT SYSTEMS AND CONTROL INPUT APPARATUSES WITH HIGH ELECTRICAL RESISTANCE FOR USE WITH AERIAL LIFT SYSTEMS

RELATED APPLICATIONS

This patent application is a continuation application claiming priority benefit, with regard to all common subject matter of U.S. patent application Ser. No. 18/102,958, filed Jan. 30, 2023, and entitled "AERIAL LIFT SYSTEMS AND CONTROL INPUT APPARATUSES WITH HIGH ELECTRICAL RESISTANCE FOR USE WITH AERIAL LIFT SYSTEMS." The above-referenced patent application is hereby incorporated by reference in its entirety into the present application.

FIELD

The present disclosure generally pertains to aerial lift systems as well as control input apparatuses for use with aerial lift systems, including control input apparatuses that exhibit high electrical resistance.

BACKGROUND

An aerial lift system may be used to perform work at an aerial worksite. The aerial lift system may be controlled at least in part by a control input apparatus. The control input apparatus may be operated by a worker situated in a platform of the aerial lift system. The present disclosure provides improved aerial lift systems as well as improved control input apparatuses for use with aerial lift systems.

SUMMARY

Aspects, features, and advantages of the presently disclosed subject matter are set forth in part in the following description. Further aspects and advantages may be apparent from the description or through practicing the presently disclosed subject matter.

In one aspect, the present disclosure provides control input apparatuses for operating an aerial lift system. A control input apparatus may include a control lever assembly. The control lever assembly may include at least one control lever and at least one position sensor. The at least one position sensor may be configured to indicate a position and/or a movement of the at least one control lever. The control lever assembly may include a control input element and at least one interlock sensor. The control input element may be actuatable over a movement range from a non-actuated position to a fully-actuated position.

In some embodiments, the at least one interlock sensor may be configured to release an interlock corresponding to the control lever assembly upon the control input element being actuated at least to an actuation threshold position located between the non-actuated position and the fully-actuated position. Upon the control input element being actuated at least to the actuation threshold position, the control input apparatus may provide control inputs corresponding to the position and/or the movement of the at least one control lever indicated by the at least one position sensor. The actuation threshold position may be located at from 20% to 80% of the movement range.

Additionally, or in the alternative, in some embodiments, the at least one interlock sensor may indicate a position and/or a movement of the control input element, and the control input apparatus may modulate the control inputs corresponding to the at least one control lever based at least in part on the position and/or a movement of the control input element indicated by the at least one interlock sensor.

In another aspect, the present disclosure provides aerial lift systems. An aerial lift system may include a base, a boom assembly coupled to the base, and a platform assembly coupled to the boom assembly. The boom assembly may include one or more boom actuators. The platform assembly may include at least one control input apparatus configured to control the one or more boom actuators.

In yet another aspect, the present disclosure provides computer-readable media. A computer-readable medium may include computer-executable instructions, which when executed by at least one processor associated with a control input apparatus for an aerial lift system, cause the at least one processor to perform operations. In some embodiments, the operations may include determining an interlock indication from an interlock sensor and releasing an interlock corresponding to a control lever assembly responsive to the interlock indication from the interlock sensor. The interlock indication may indicate a position and/or a movement with respect to a control input element being actuated at least to an actuation threshold position located within a movement range from a non-actuated position to a fully-actuated position. The actuation threshold position may be located at from 20% to 80% of the movement range. The control lever assembly may include at least one control lever and at least one position sensor.

Additionally, or in the alternative, in some embodiments, the operations may include determining a position indication from the at least one position sensor and providing a control input based at least in part on the position indication. The position indication may indicate a position and/or a movement of the least one control lever. The control input may be configured to control one or more boom actuators of an aerial lift system. The control input may be provided with the control input element actuated at least to the actuation threshold position. In some embodiments, the operations may include modulating the control input based at least in part on the position and/or movement of the control input element indicated by the interlock indication from the interlock sensor.

These and other aspects, features, and advantages thereof are further understood with reference to the following description, the accompanying drawing figures, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Embodiments of the present are described in detail below with reference to the attached drawing figures, wherein:

FIG. 1A schematically depicts a perspective view of one embodiment of an aerial lift system;

FIG. 1B schematically depicts a perspective view of a platform assembly that may be included in an aerial lift system;

FIG. 2A schematically depicts a perspective view of one embodiment of a control input apparatus for an aerial lift system;

FIG. 2B schematically depicts a perspective view of another embodiment of a control input apparatus for an aerial lift system;

FIG. 2C schematically depicts a perspective view of yet another embodiment of a control input apparatus for an aerial lift system;

FIG. 3A schematically depicts a first perspective view of a control lever assembly of a control input apparatus;

FIG. 3B schematically depicts a second perspective view of the control lever assembly FIG. 3A;

FIG. 4A schematically depicts a side view of a control input element that may be included in a control input apparatus;

FIG. 4B schematically depicts a side view of another control input element that may be included in a control input apparatus;

FIG. 4C shows a chart depicting a modulation of a command value based on a position of a control input element;

Figure 3A:
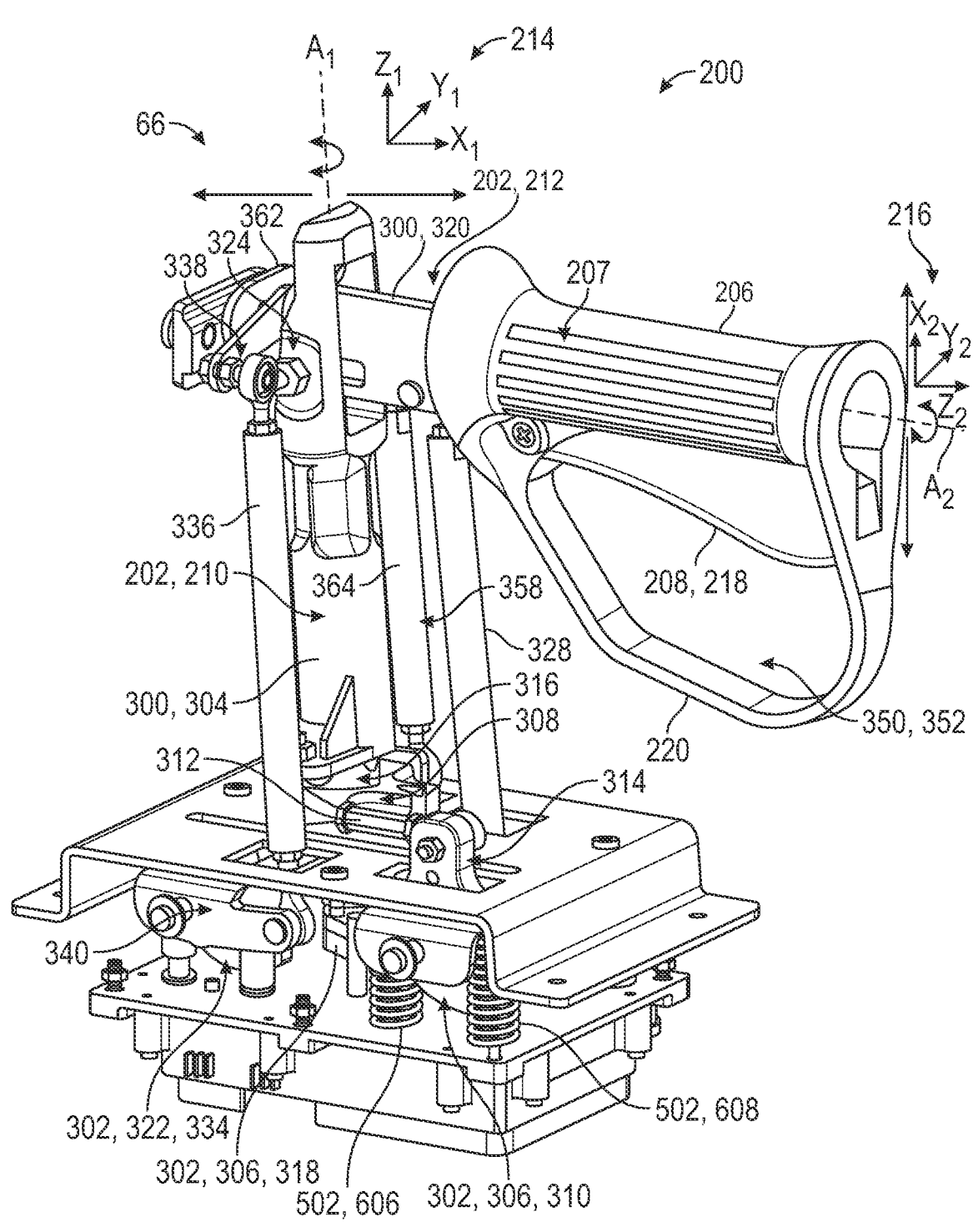
Figures 4D, 4E:
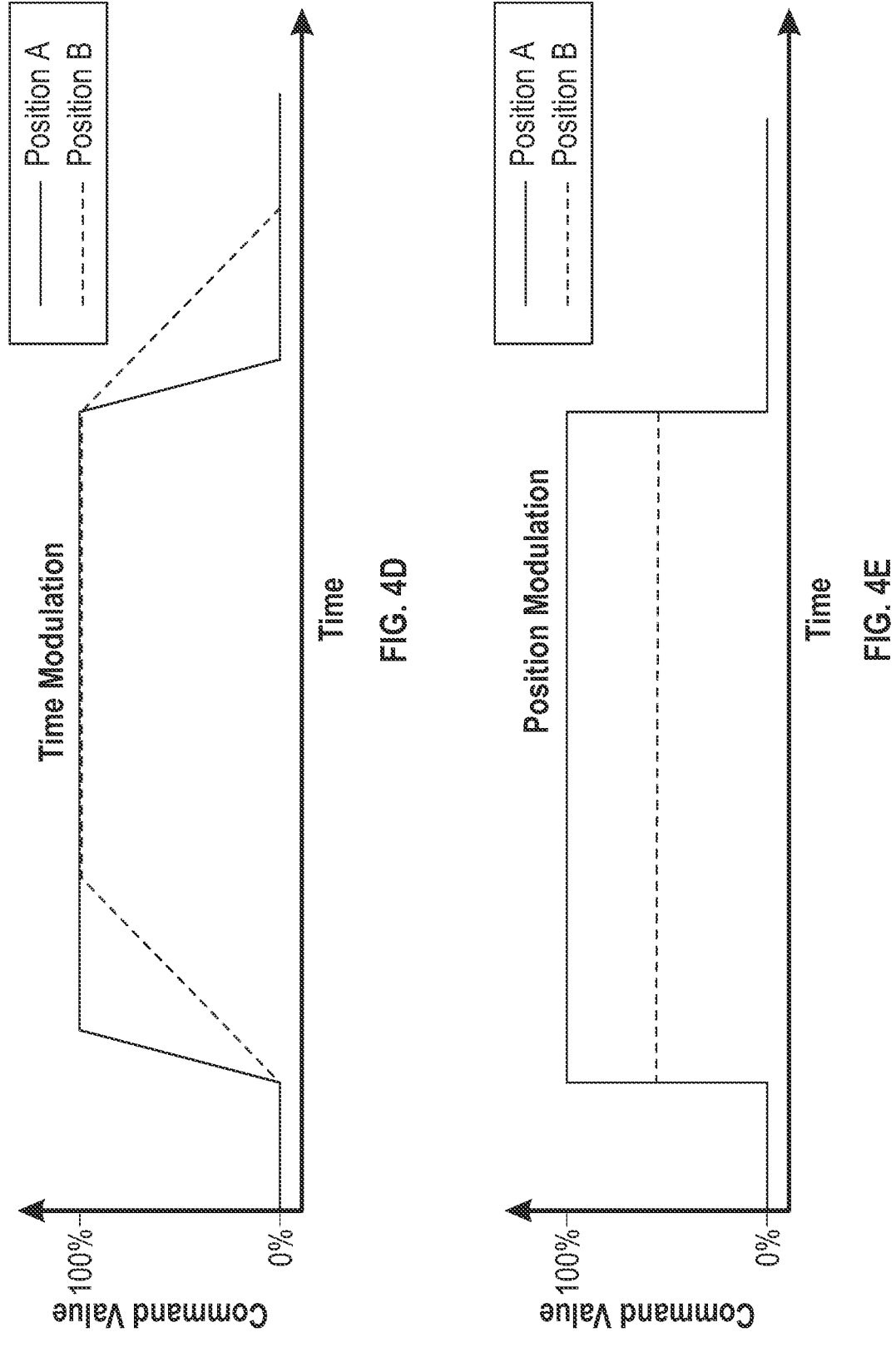
FIG. 4D shows a chart depicting a time modulation that may be imparted by a control input element.
FIG. 4E shows a chart depicting a position modulation that may be imparted by a control input element.
Figures 5A, 5B:
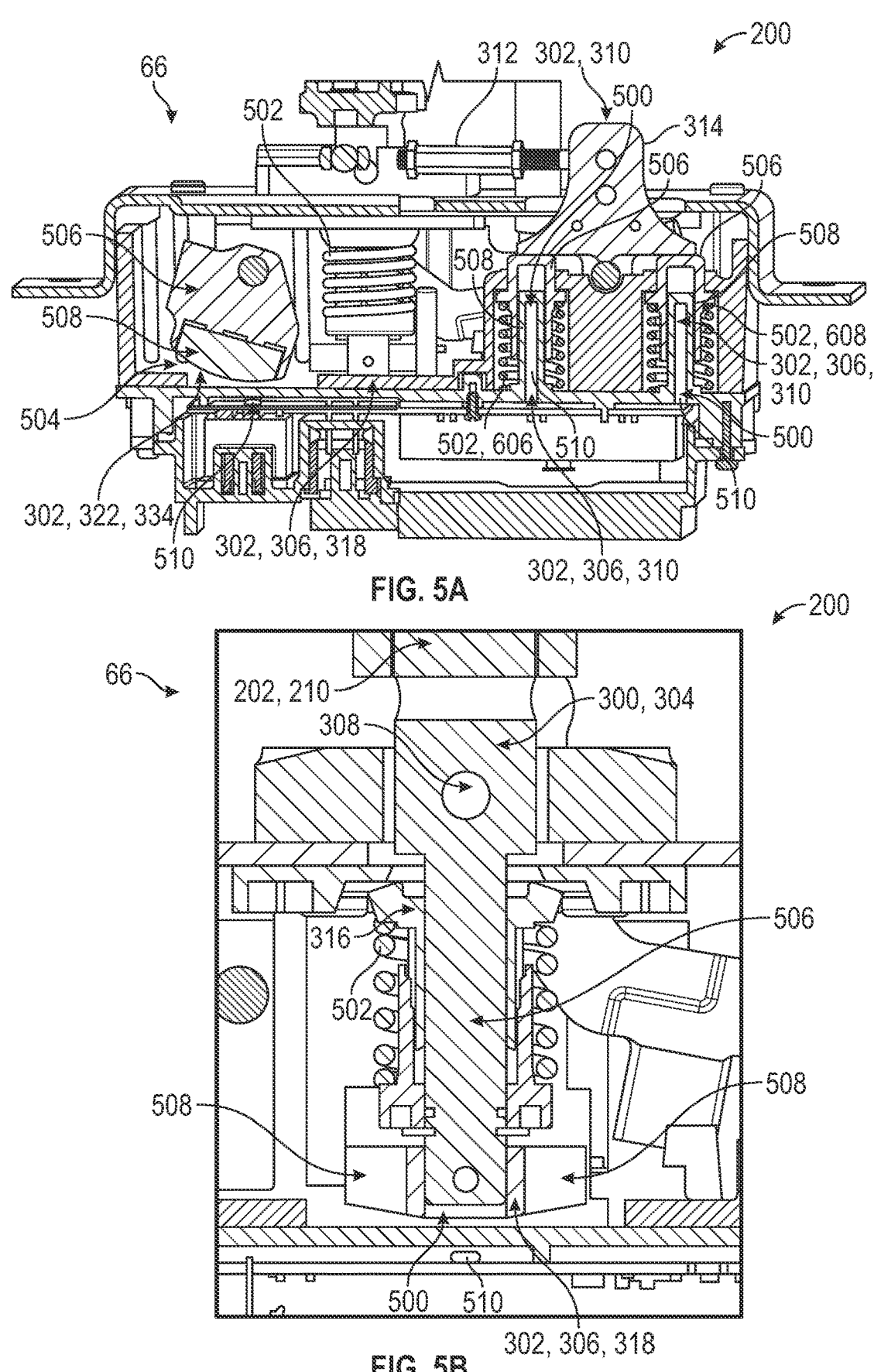
Figures 5C, 5D, 5E, 5F, 5G:
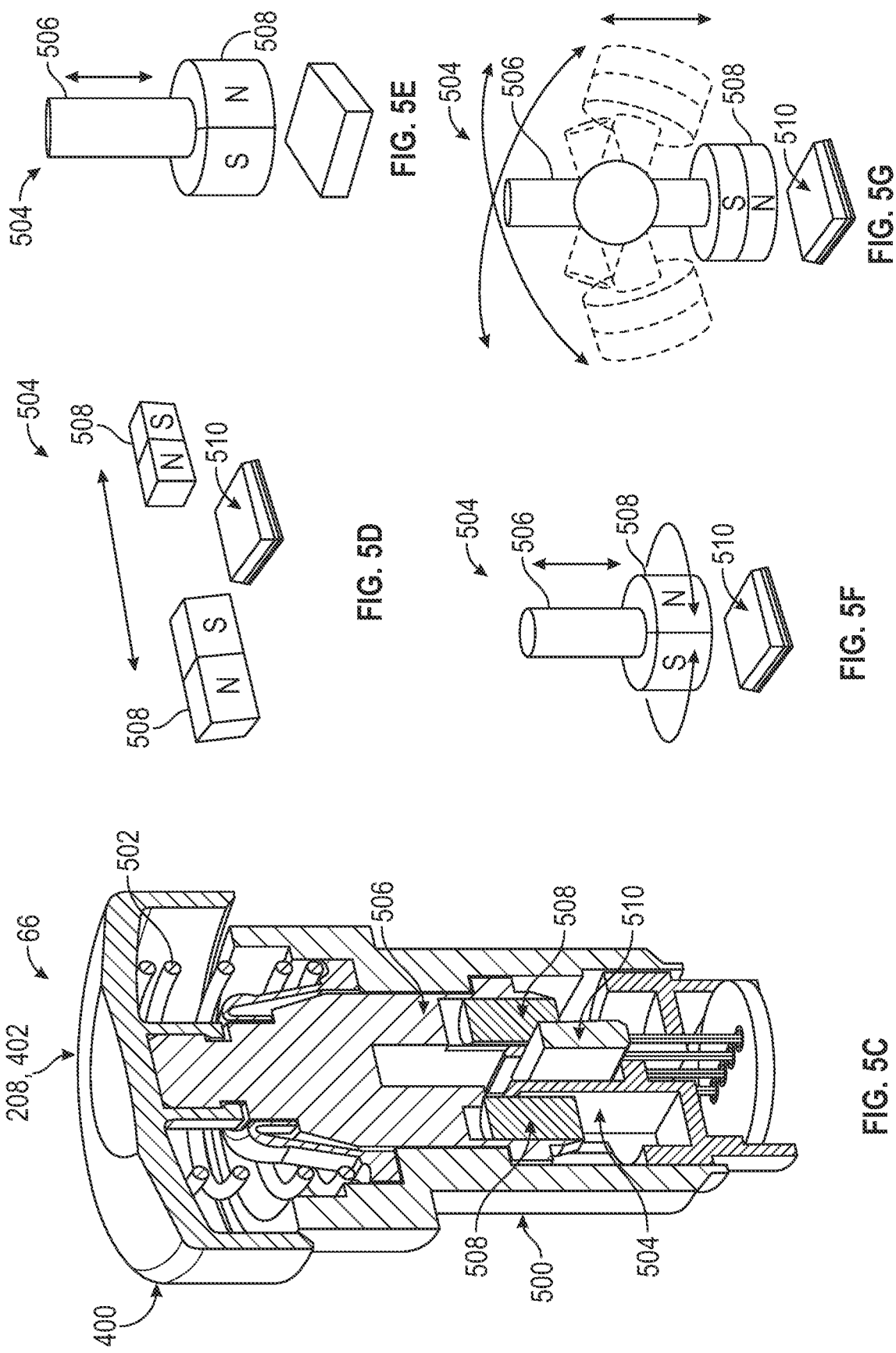
Figure 6A:
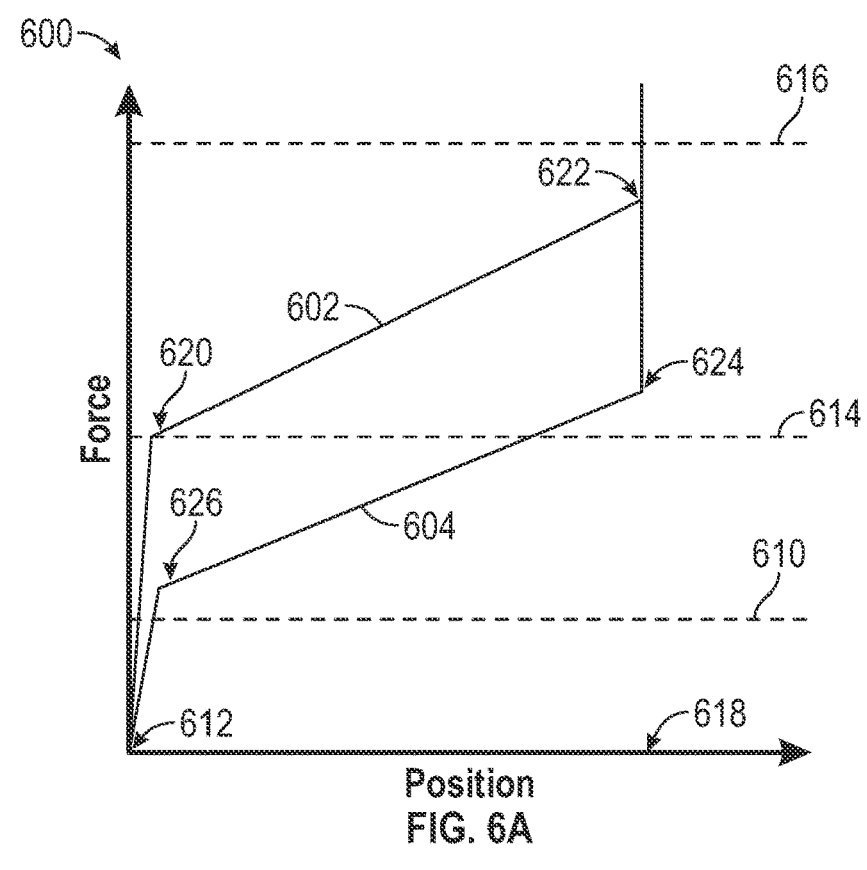
Figure 6B:
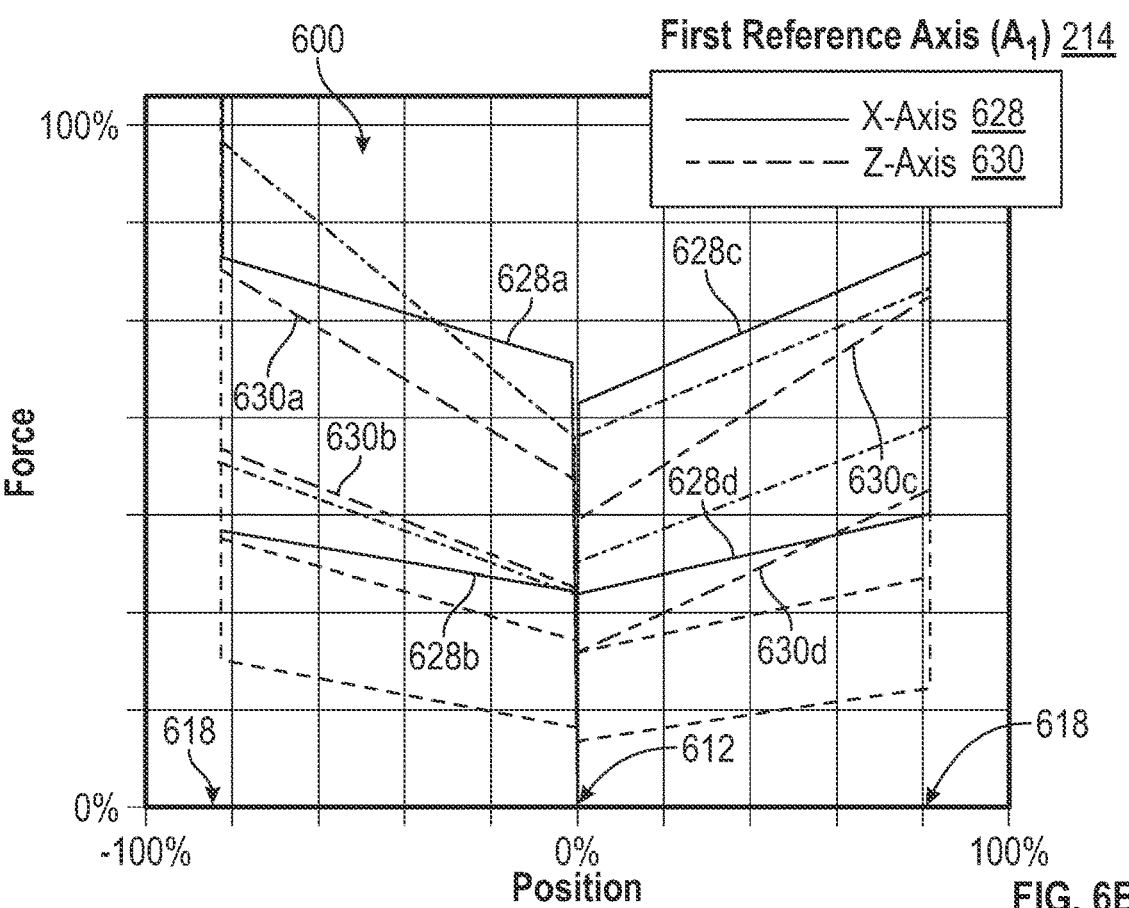
Figure 6C:
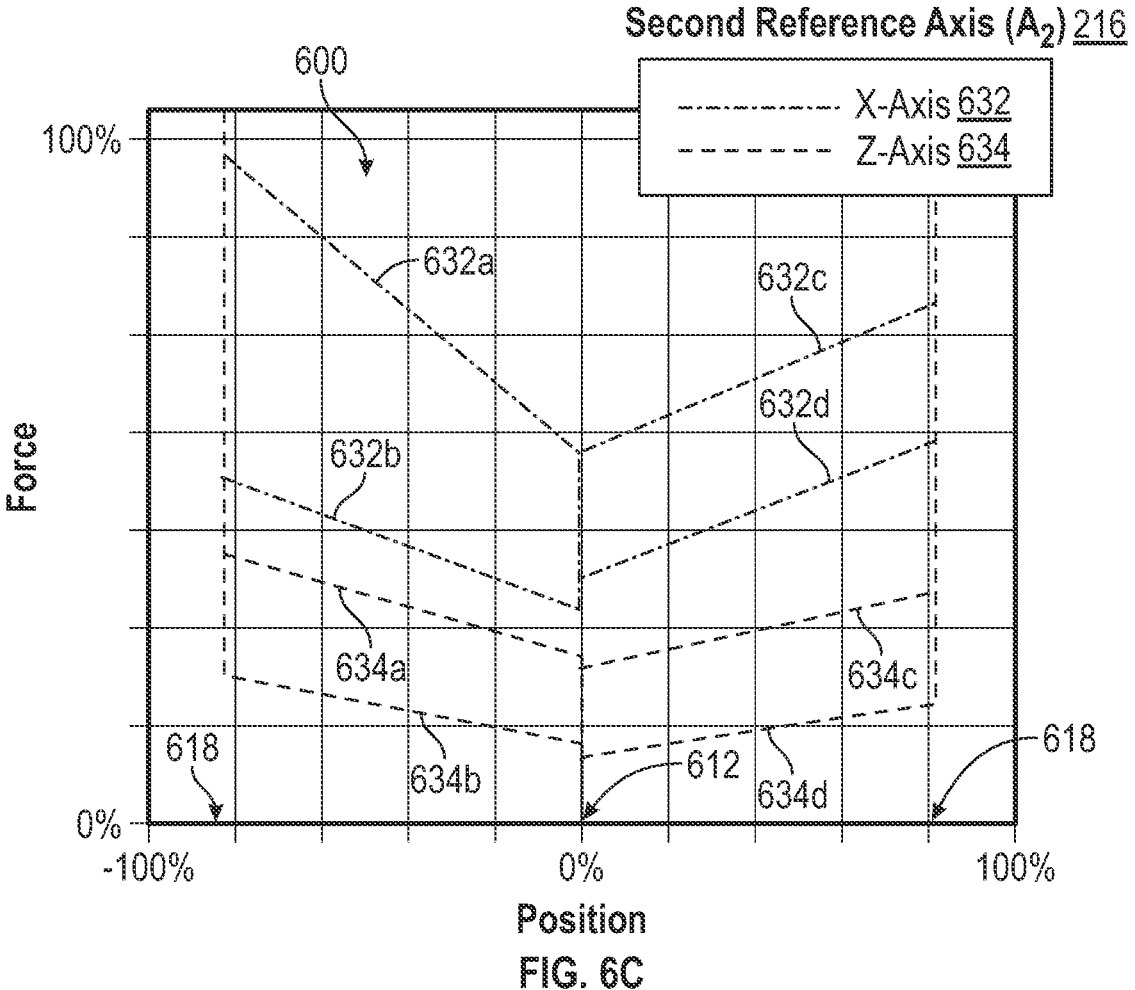
Figure 6D:
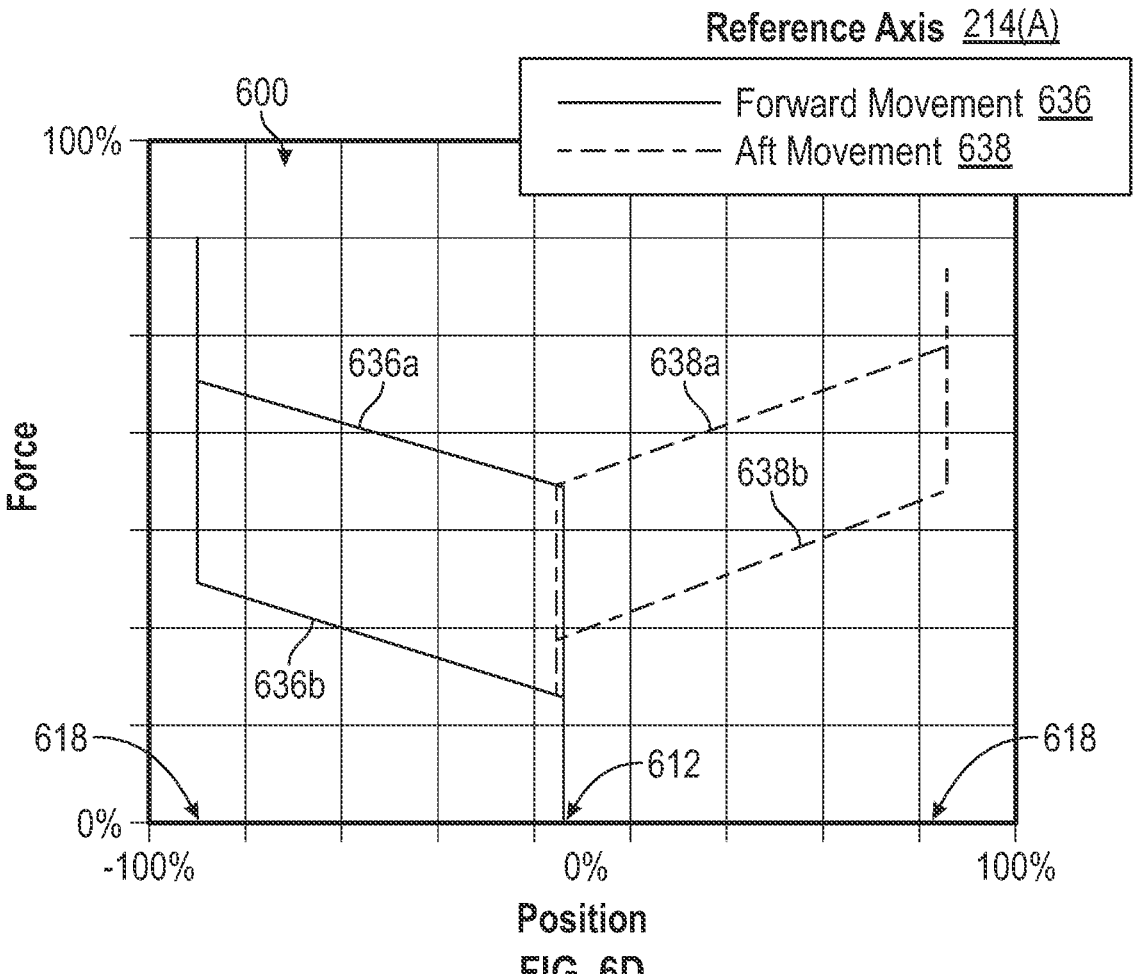
Figure 7A:
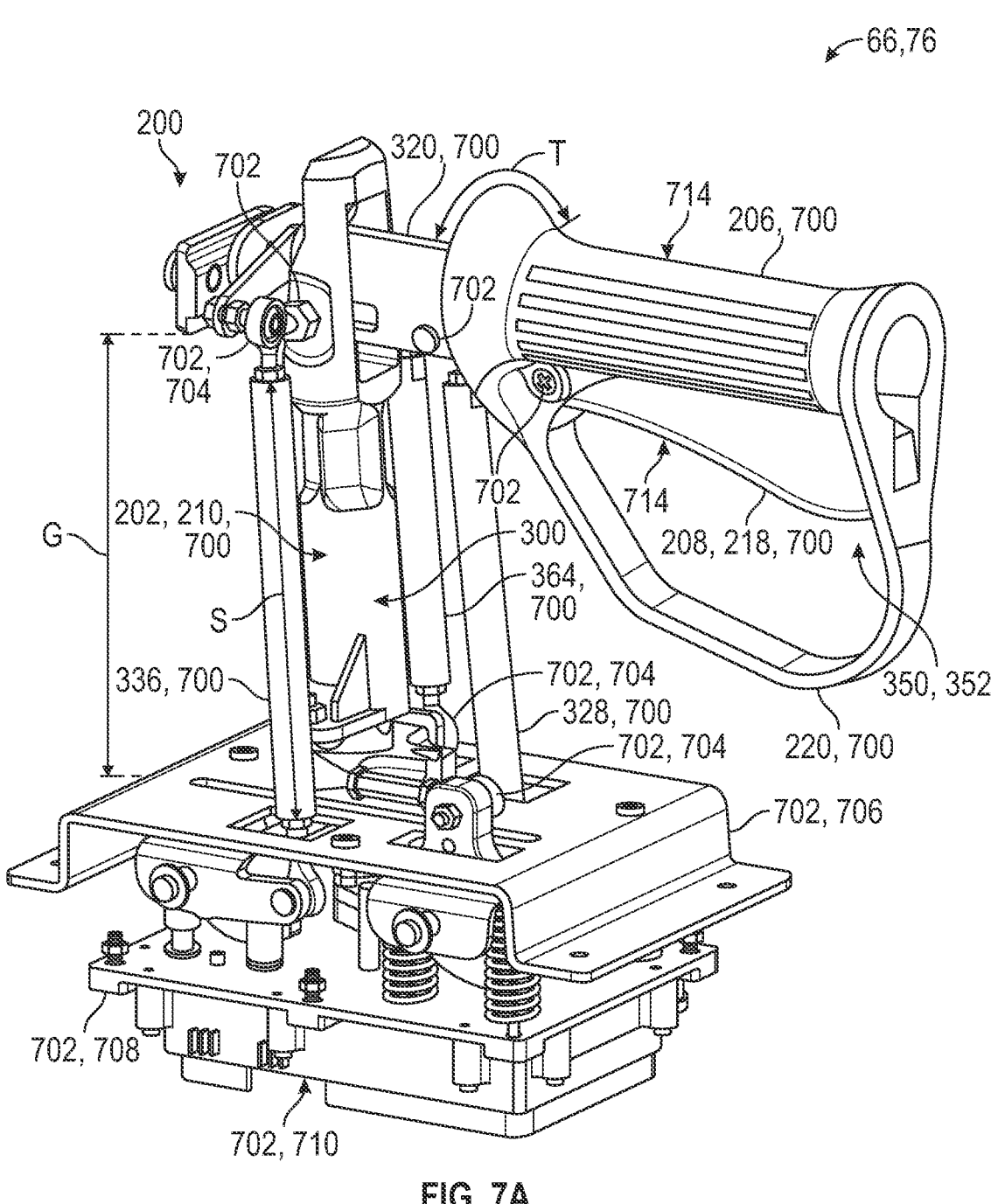
Figures 7B, 7C:
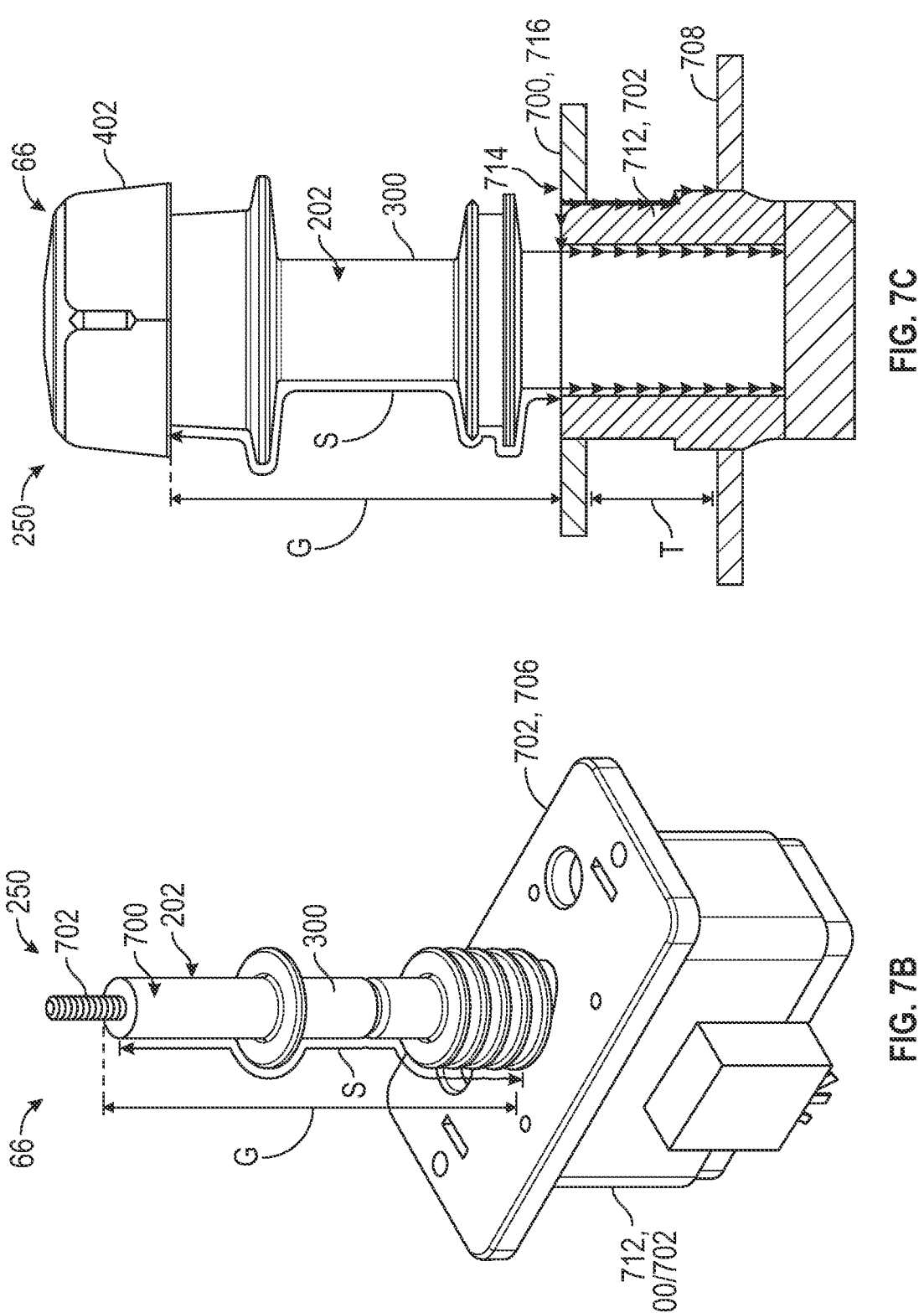
Figures 7D, 7E, 7F:
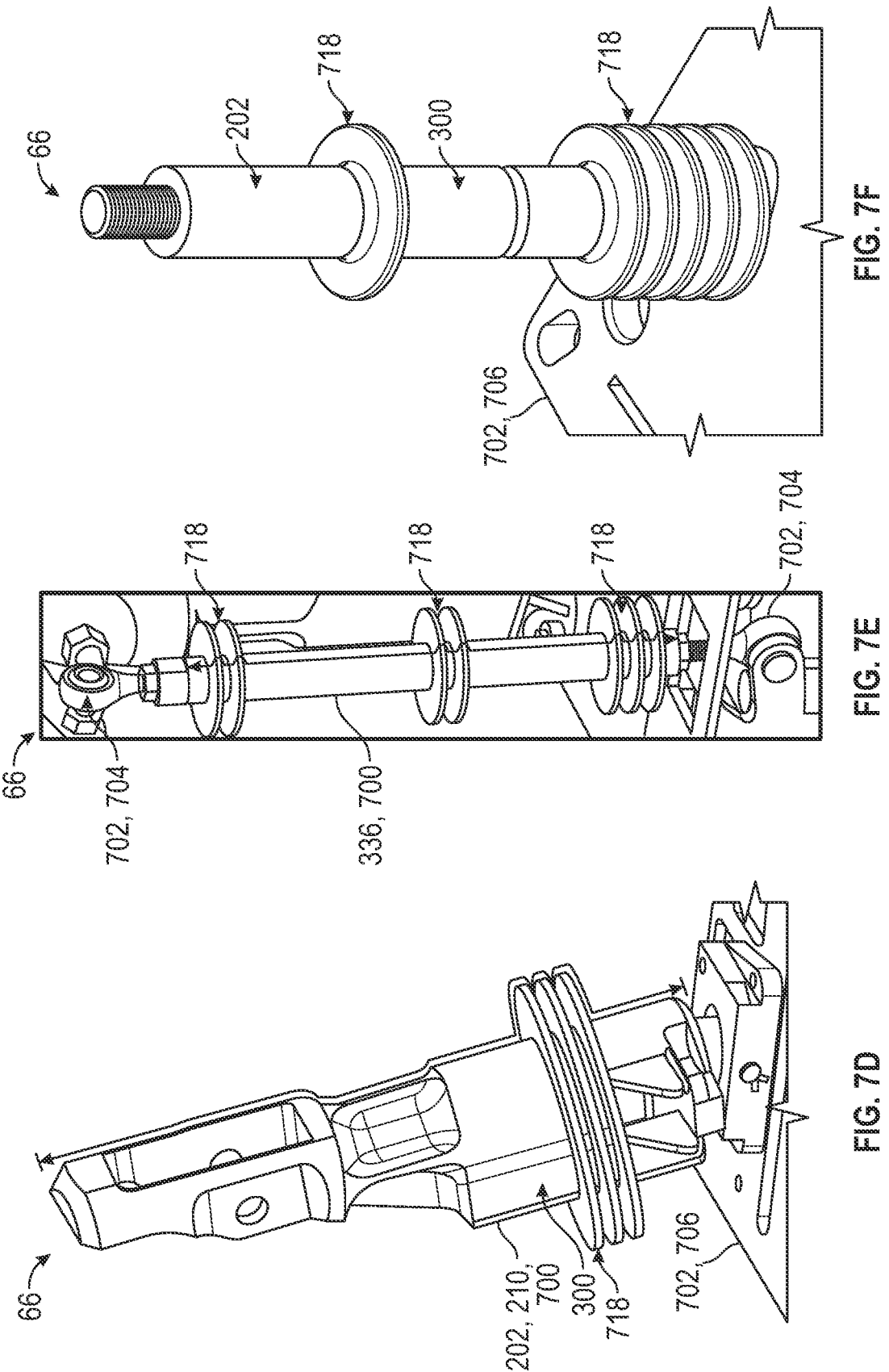
Figure 8A:
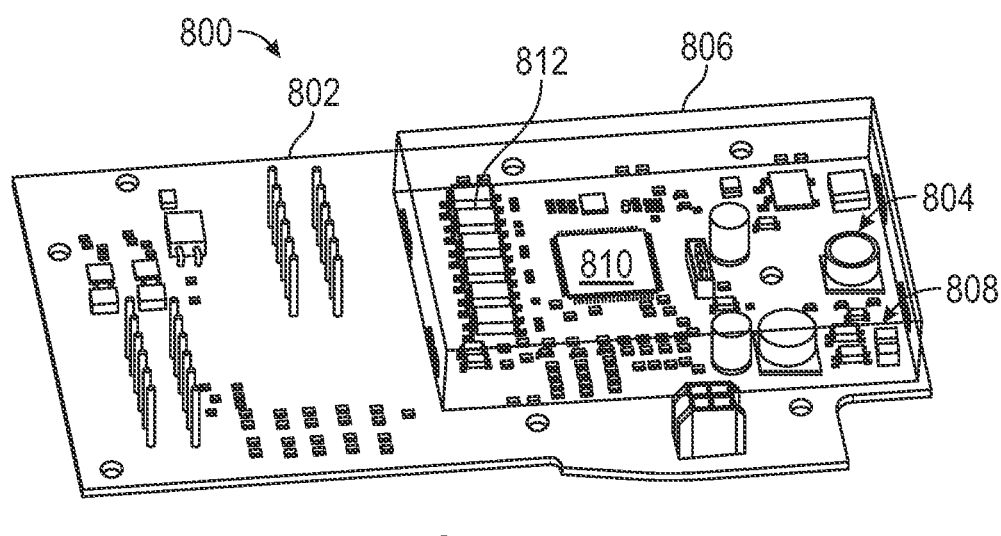
Figure 8B:
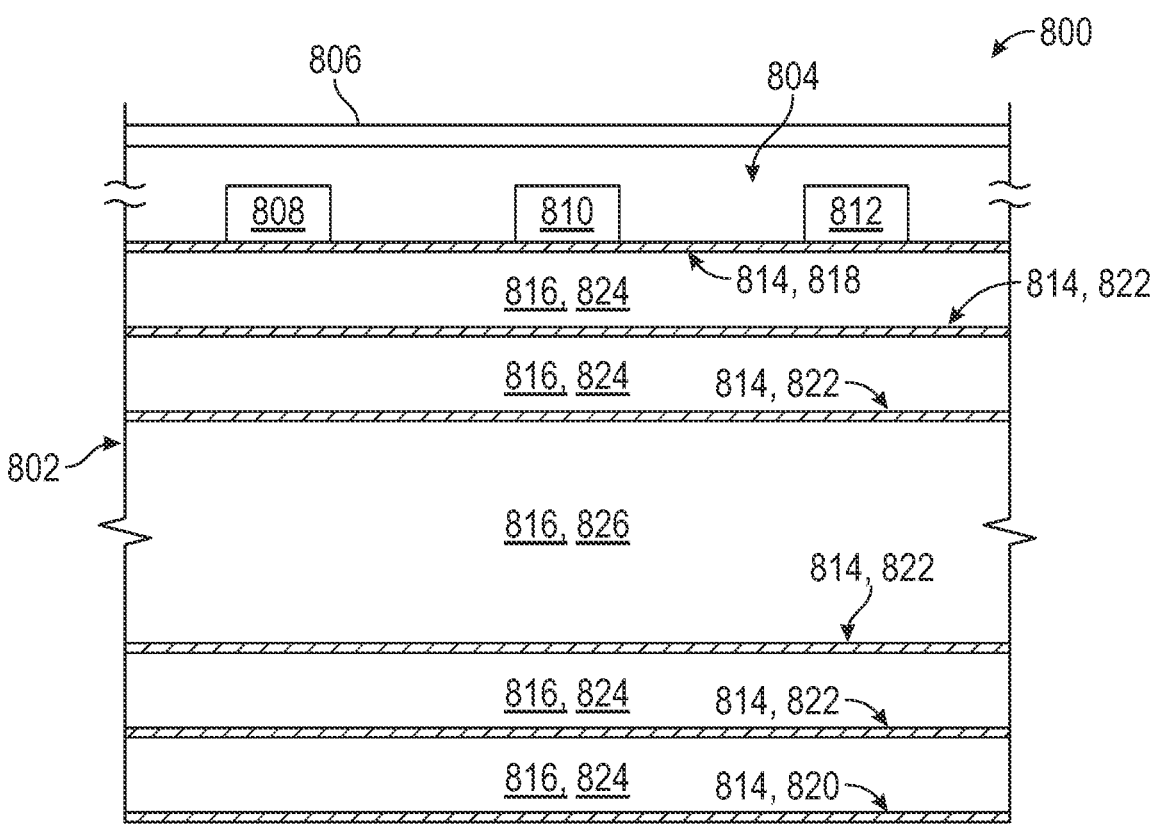
Figure 9:
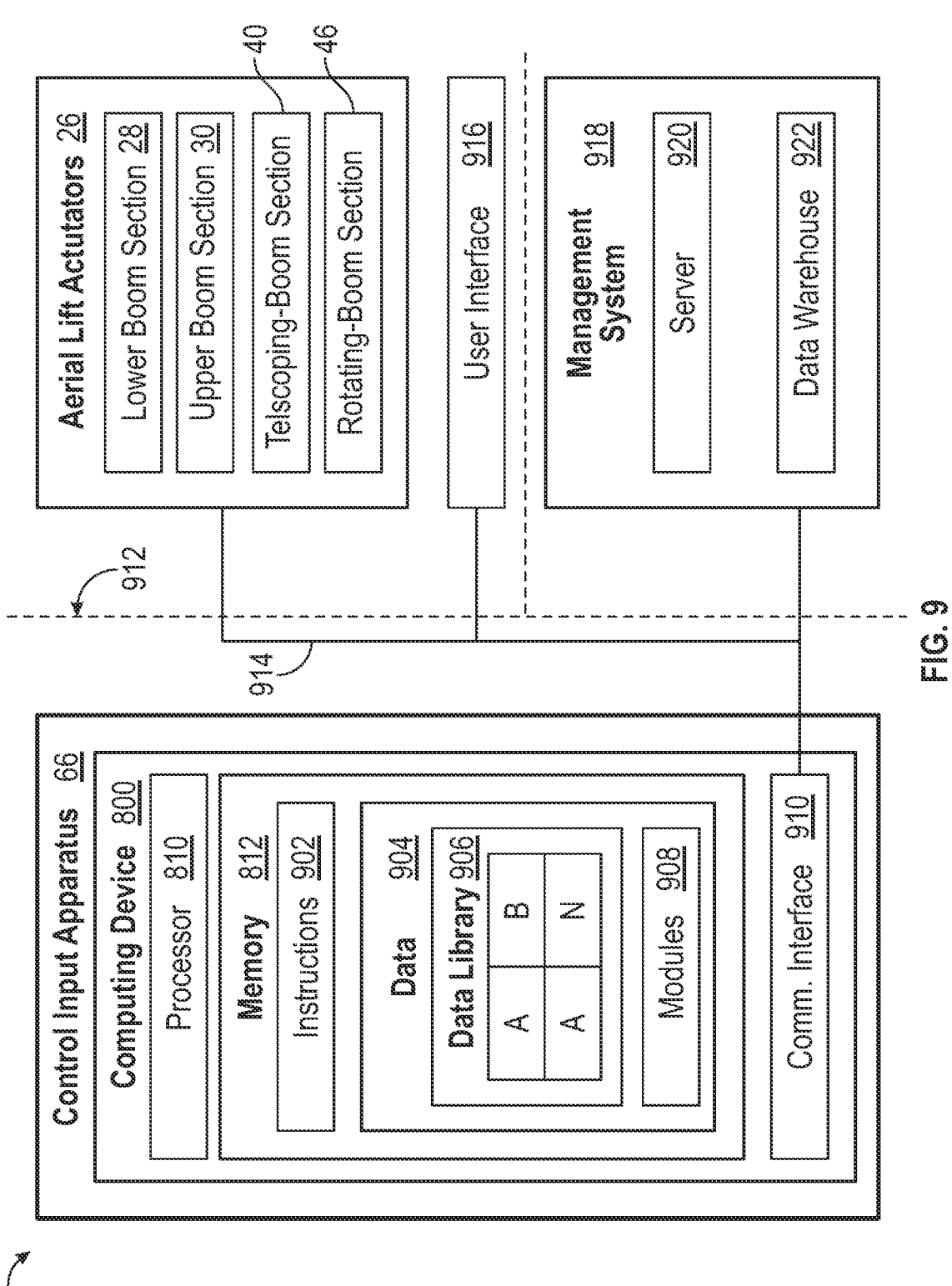

FIG. 5A schematically depicts a first cross-sectional view of the control lever assembly of FIG. 3A;

FIG. 5B schematically depicts a second cross-sectional view of the control lever assembly of FIG. 3A;

FIG. 5C schematically depicts a cross-sectional view of the control input element of FIG. 4B;

FIGS. 5D-5G respectively schematically depict an example embodiment of a position sensor that may be include in a control input apparatus;

FIG. 6A shows a chart depicting a relationship between force and position corresponding to a control input element;

FIG. 6B shows a chart depicting movement curves for a first reference axis of a multi-axis control input apparatus;

FIG. 6C shows a chart depicting movement curves for a second reference axis of the multi-axis control input apparatus of FIG. 6B;

FIG. 6D shows a chart depicting movement curves for a single-axis control input apparatus;

FIG. 7A schematically depicts a perspective view of a control lever assembly of a control input apparatus;

FIG. 7B schematically depicts a perspective view of a control lever assembly of another control input apparatus;

FIG. 7C schematically depicts a side view with a partial cross-sectional view of a control lever assembly of yet another control input apparatus;

FIG. 7D schematically depicts a perspective view of a control lever of a control input apparatus;

FIG. 7E schematically depicts a perspective view of another control lever of a control input apparatus;

FIG. 7F schematically depicts a perspective view of a control lever of another control input apparatus;

FIG. 8A schematically depicts a perspective view of an example computing device of a control input apparatus;

FIG. 8B schematically depicts a cross-sectional view of an example computing device of a control input apparatus;

FIG. 9 shows a block diagram that schematically depicts an example computing system of a control input apparatus; and FIG. 10 shows a flowchart that depicts an example method of controlling an aerial lift system.

The drawing figures illustrate example embodiments of the presently disclosed subject matter. The claims are not limited to the example embodiments depicted in the drawing figures. The aspects and features depicted in the drawing figures are not necessarily to scale. Repeat use of reference characters in the specification and drawing figures represent the same or analogous aspects or features.

DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed subject matter. The present disclosure is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the example embodiments in this description.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, or joined with one another, including by way of an interference fit, one or more fastening elements or hardware, by welding, or the like. The term "coupled" includes objects that are removably coupled with one another.

The term "integral" or "integrally formed," when used herein with reference to at least to elements, refers to two elements that respectively define a portion, part, or piece of one and the same object, and/or two objects that are permanently coupled to one another such that the objects cannot be separated from one another without destructive means. The term "integral" includes a portion, part, or piece of an element that cannot be separated from the whole of the element without destructive means. For example, the term "integral" may refer to objects that are welded together, objects that are formed or cast as a single unit, as well as portions, parts, or pieces of a single, monolithic object.

The present disclosure provides aerial lift systems as well as control input apparatuses for aerial lift systems. An aerial lift system may include a platform assembly for an operator to perform work at an aerial worksite. Additionally, or in the alternative, an aerial lift system may include one or more auxiliary systems that can perform work at an aerial worksite, such as a robot, a hoist, a tool, a machine, or the like. A control input apparatus may be used by an operator to provide control inputs to control and/or operate the aerial lift system and/or the one or more auxiliary systems.

In accordance with the present disclosure, a control input apparatus may include one or more disclosed features that are configured, at least in part, in view of one or more ergonomic factors and/or kinesthetic factors. The presently disclosed control input apparatuses may be easier for an operator to use, particularly when wearing gloves, such as electrical lineman gloves. Additionally, or in the alternative, the presently disclosed control input apparatuses may provide more responsive control inputs. Additionally, or in the alternative, the presently disclosed control input apparatuses may include enhanced safety features, including safety features associated with operating at an aerial worksite, such as near electrical transmission lines. These and other improvements may be realized by one or more of the presently disclosed features and/or combinations thereof.

In some embodiments, the presently disclosed control input apparatuses may include an interlock system that may be easier for an operator to operate, such as when wearing gloves (e.g., electrical lineman gloves). The interlock system may include a control input element, such as a trigger, integrated with a handle and a trigger guard, that includes features configured to improve operator grip and feel. The interlock system may additionally or alternatively include a mechanical interlock and/or an electrical interlock that provide improved interlock release characteristics, including improved responsiveness and improved operability.

Additionally, or in the alternative, the presently disclose control input apparatuses may include control lever assemblies that provide for more responsive control inputs. For example, the control lever assemblies may include a control input modulator that modulates a control input based on a position of the control input modulator. Additionally, or in the alternative, the control lever assemblies may include one or more movement modalities that exhibit one or more movement characteristics, such as a force associated with moving a control lever according to a movement modality, that depend at least in part on a position along a movement curve corresponding to the movement modality. In some embodiments, the one or more movement modalities may be modulated at least in part by a control input modulator. In some embodiments, the control input modulator may utilize fine motor movements while the control lever assembly may utilize gross motor movements.

In some embodiments, the presently disclosed control input apparatuses may provide improved operator safety associated with work around electromagnetic fields, such as those associated with electrical transmission lines. The improved operator safety may be realized at least in part by the improved ease of use and responsiveness of the presently disclosed input apparatuses. Additionally, or in the alternative, improved operator safety may be realized by the presently disclosed control input apparatus exhibiting high electrical resistance.

The term "high electrical resistance," as used herein with reference to a control input apparatus, refers to a control input apparatus that exhibits less than or equal to a maximum current when exposed to a specified voltage for a specified duration in accordance with an electrical resistance test for the control input apparatus.

The term "electrical resistance test," as used herein with reference to determining a high electrical resistance of a control input apparatus, refers to a test configured to determine an electrical resistance of the control input apparatus, in which a voltage source is coupled to an operator contact point at a first side of the control input apparatus and an ammeter is coupled to a conductive component at a second side of the control input apparatus opposite to the first side, and a voltage is applied via the voltage source at a specified voltage level for a specified duration while electric current is measured via the ammeter. The specified voltage level may be from 1 kV to 1,000 kV. The specified duration may be from 1 minute to 5 minutes, such as 3 minutes. The specified voltage level depend at least in part on the intended use of the control input apparatus and/or the environment within which the control input apparatus is intended to be used. The specified voltage may correspond to a maximum voltage level associated with such intended use and/or environment for the control input apparatus. For example, electrical resistance test for corresponding to a control input apparatus for use in association with transmission power lines (such as those used to transmit power from a generation station to a transmission substation) may have a significantly higher specified voltage level as compared, for example, to an electrical resistance test for corresponding to a control input apparatus for use in association with distribution power lines (such as those used to distribute power from a distribution substation to residential customers). The specified duration may be selected to obtain a representative sample size for the electrical current measurement.

By way of illustration, an electrical resistance test for a control input apparatus intended for use in association with transmission power lines may have a specified voltage level of from 200 kV to 500 KV, such as at least 500 kV. Additionally, or in the alternative, an electrical resistance test for a control input apparatus intended for use in association with distribution power lines may have a specified voltage level of from 4 kV to 16 kV, such as at least 4 kV, at least 12 kV, or at least 16 kV. Additionally, or in the alternative, an electrical resistance test for a control input apparatus intended for use in association with subtransmission power lines may have a specified voltage level of from 30 kV to 200 kV, such as at least 30 kV, at least 40 kV, at least 66 kV, at least 115 kV, or at least 200 kV. Additionally, or in the alternative, an electrical resistance test for a control input apparatus intended for use in association with a generating station (e.g., prior to transformed that step-up the voltage for power transmission, etc.) may have a specified voltage level of from 30 kV to 250 kV, such as at least 30 kV, or at least 50 kV. In some embodiments, the electrical resistance test may be performed according to an industry standard applicable to the control input apparatus. For example, in some embodiments, the electrical resistance test may be performed according to ANSI A92.2-2021, Confirmation Test 5.4.2.6. An electrical resistance test performed according to ANSI A92.2-2021, Confirmation Test 5.4.2.6 has a specified voltage level of 40 kV and a specified duration of 3 minutes.

A control input apparatus may satisfy an electrical resistance test when the control input apparatus exhibits a current that is less than or equal to a specified maximum current when exposed to the specified voltage for the specified duration. The specified maximum current may depend on an intended user of the control input apparatus and/or the required personal protective equipment to be utilized with the control input apparatus. In some embodiments, the specified maximum current may be from 0.4 milliampere to 5 milliampere, such as 0.4 milliampere or less (generally corresponding to perceptibility limit), such as 1 milliampere or less (generally corresponding to faint tingle), or such as 5 milliampere or less (generally corresponding to a slight, non-painful shock). By way of example, a control input apparatus satisfies an electrical resistance test performed according to ANSI A92.2-2021, Confirmation Test 5.4.2.6, when the when the control input apparatus exhibits a current of 0.4 milliampere or less when exposed to 40 kV AC for 3 minutes.

A control input apparatus may include one or more dielectric components. As used herein, the term "dielectric component" refers to a component that includes a dielectric, or that is formed, of, one or more dielectric materials. One or more components of the control input apparatus may include, or may be formed of, one or more dielectric materials. As used herein, the term "dielectric" or "dielectric material" refers to an electrical insulator that can be polarized by an applied electric field. When a dielectric material is placed in an electric field, the dielectric material exhibits dielectric polarization. The dielectric polarization exhibits an internal electric field that reduces the overall field within the dielectric material. A high electrical resistance exhibited by a control input apparatus may be attributable at least in part to the control input apparatus including one or more dielectric components. The high electrical resistance of the presently disclosed control input apparatuses may inhibit and/or reduce the possibility of an electrical discharge, such as a corona discharge, associated with the control input apparatus.

As used herein, the term "electrical insulator," or "electrically insulative material" refers to a material through which electric current does not flow freely. An electrical insulator or an electrically insulative material may have a resistivity of at least $1\times10^{-10}$ ohm-meter ($\Omega\cdot$m), such as from $1\times10^{-10}$ to $1\times10^{-30}$ $\Omega\cdot$m, or such as from $1\times10^{-12}$ to $1\times10^{-25}$ $\Omega\cdot$m.

A control input apparatus may include, or may be formed of, one or more electrically conductive components. As used herein, the term "electrically conductive component" refers to a component that includes an electrical conductor, or that is formed, of one or more to electrically conductive materials. As use herein, the term "electrical conductor" or "electrically conductive material" refers to a material through which electric current freely flows. An electrical conductor may have an electrical conductivity of from $1\times10^{-9}$ siemens per meter (S/m) to $7\times10^{7}$ S/m, such as from $1\times10^{5}$ to $1\times10^{7}$ S/m, or such as from $1\times10^{7}$ to $6.4\times10^{7}$ S/m.

In some embodiments, the presently disclosed control input apparatuses may include at least one computing device configured to communicate across a network, such as a Controller Area Network (CAN). The at least one computing device may include one or more features that enable the computing device to reliably transmit and/or receive communications in and around electromagnetic fields, such as those associated with electrical power transmission lines.

These and other features of the presently disclosed aerial lift systems and control input apparatuses are described with reference to the Figures.

Figure 1A:
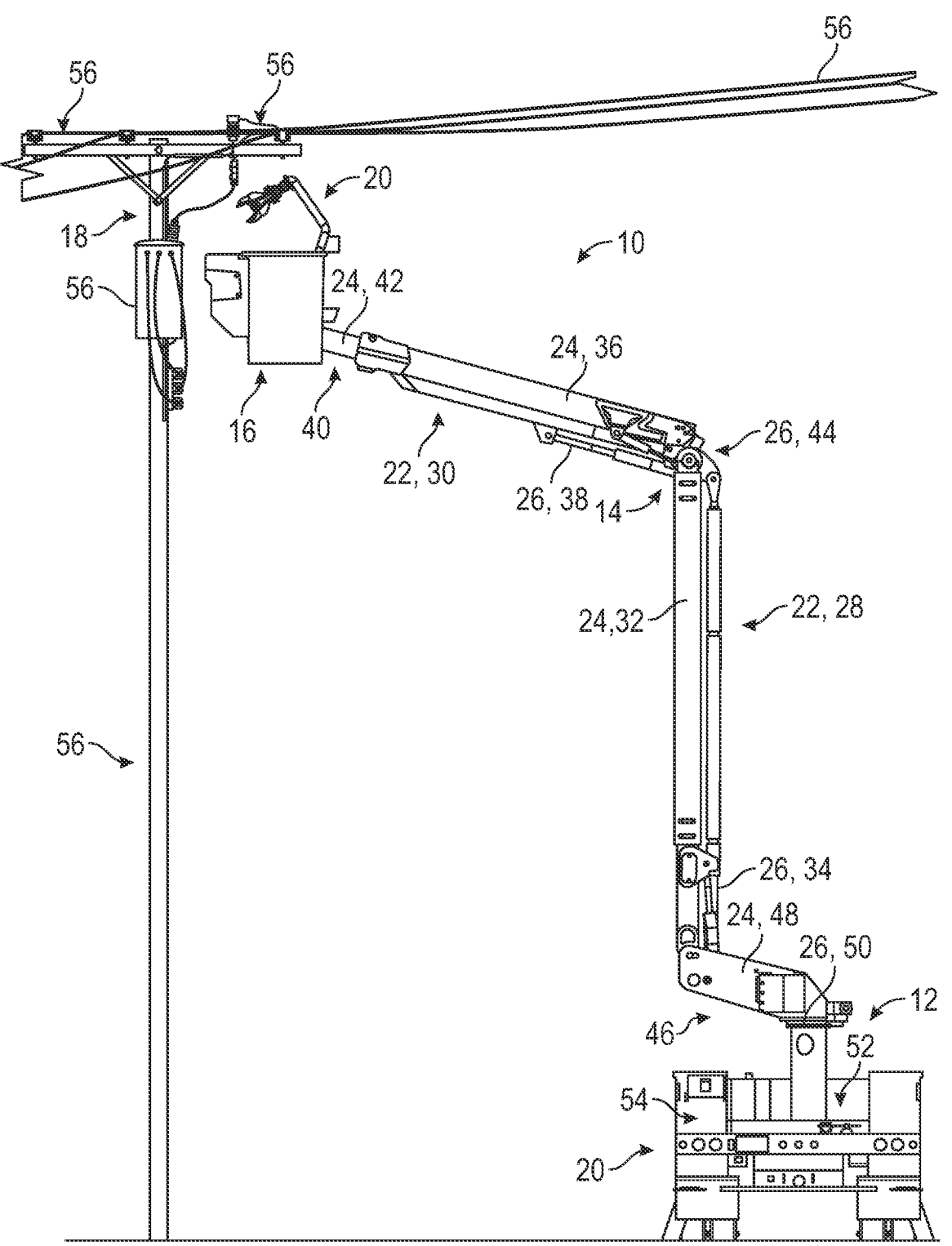
Figure 1B:
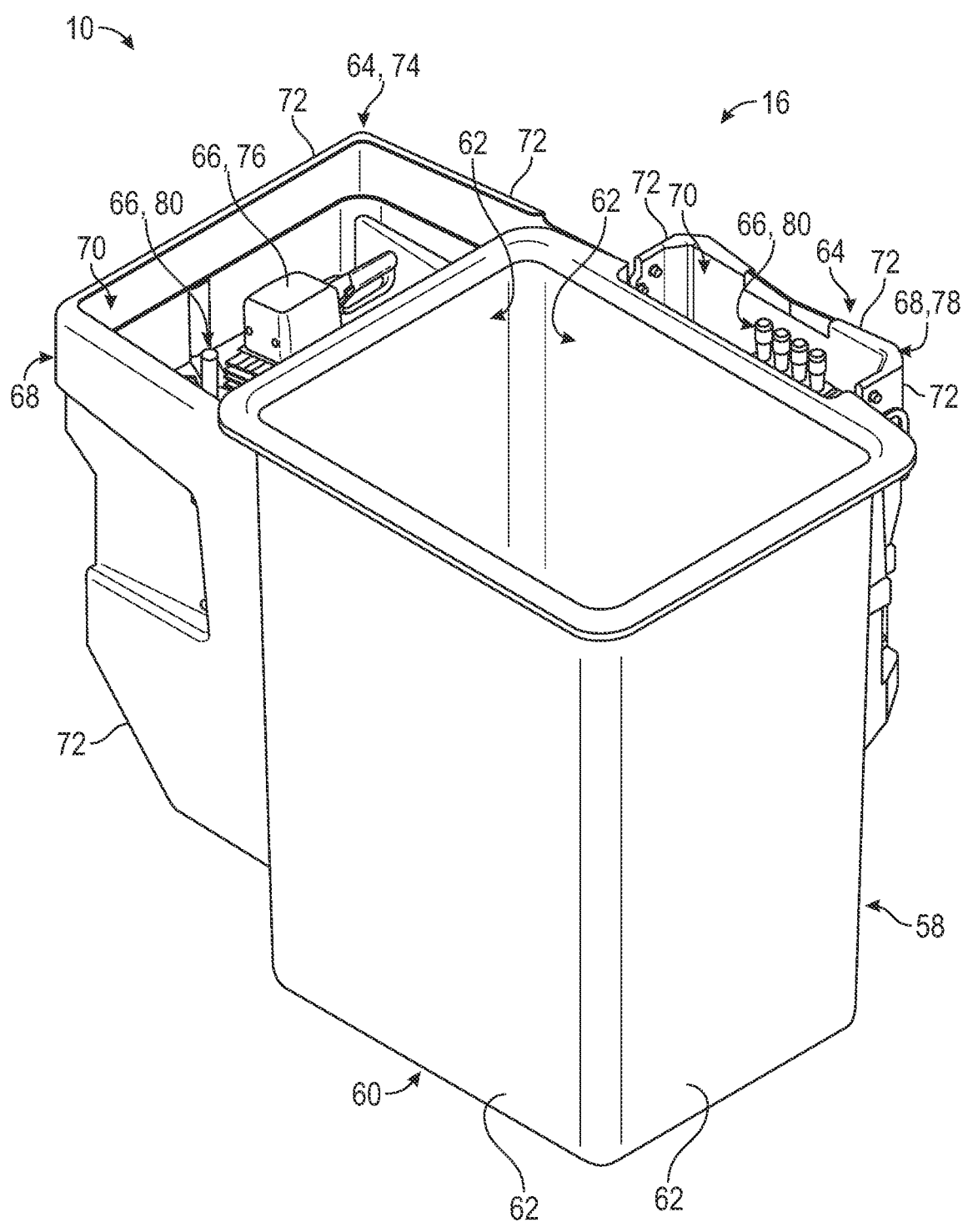

Referring now to FIGS. 1A and 1B, the presently disclosed subject matter is further described. As shown in FIG. 1A, an aerial lift system 10 may include a base 12, a boom assembly 14, and a platform assembly 16. The boom assembly 14 may be rotatably and/or pivotably coupled to the base 12. The platform assembly 16 may be coupled to the boom assembly 14. The platform assembly 16 may provide an aerial platform for performing a task at a worksite 18, such as a task performed at least in part by a utility worker, including, for example, a task performed using one or more auxiliary systems 20, such as a robot, a hoist, a tool, a machine, or the like.

The base 12 of the aerial lift system 10 may provide a stabilized platform that supports the boom assembly 14 in a variety of positions, for example, with the platform assembly 16 situated in proximity to the worksite 18. The base 12 may provide stability, such as a counterweight, to the boom assembly 14 and/or to a load supported by the boom assembly 14. In some embodiments, the base 12 may include or may be embodied as a ground-based structure, a floating structure, or an airborne structure. By way of example, the base 12 may include or may be embodied as utility truck, a crane base, an earth-working machine, a barge, a marine vessel, an oil rig, a sky crane, or a helicopter.

The boom assembly 14 may include one or more boom sections 22. The one or more boom sections 22 may respectively include a boom member 24, such as a beam, an arm, a spar, a truss, or the like. The one or more boom sections 22 may respectively include one or more aerial lift actuators 26, such as a hydraulic actuator or the like. The one or more aerial lift actuators 26 may be operable to move a corresponding boom member 24. A respective boom member 24 may be moved to a desired position by actuating the corresponding aerial lift actuator 26. The one or more boom sections 22 may be moved according to any one or more modalities, such as pivoting, telescoping, rotating, and so forth. By way of example, as shown in FIG. 1A, the boom assembly 14 may include a lower boom section 28 and an upper boom section 30. The lower boom section 28 and/or the upper boom section 30 may move according to a pivoting modality. The lower boom section 28 may include a lower boom member 32 and a lower boom actuator 34. The upper boom section 30 may include an upper boom member 36, and an upper boom actuator 38. Additionally, or in the alternative, the boom assembly 14 may include a telescoping-boom section 40 that moves according to a telescoping modality. The telescoping-boom section 40 may include a telescoping-boom member 42 and a telescoping-boom actuator 44. The telescoping-boom member 42 may be extended and/or retracted by actuating the telescoping-boom actuator 44. In some embodiments, the telescoping-boom section 40 may define at least a portion of a boom section that moves according to a pivoting modality, such as the lower boom section 28 and/or the upper boom section 30. Additionally, or in the alternative, the boom assembly 14 may include a rotating-boom section 46 that moves according to a rotating modality. The rotating-boom section 46 may include a rotating-boom member 48 and a rotating-boom actuator 50.

The aerial lift system 10 may include a power source 52, such as an engine. The power source 52 may be integrated into the base 12. By way of example, the power source 52, such as the engine, may include a combustion engine, a hybrid-electric engine, or an electric engine. The power source 52 may provide power to a hydraulic system 54 configured to operate the boom assembly 14.

As shown in FIG. 1A, the boom assembly 14 may include a rotating-boom section 46, a lower boom section 28, an upper boom section 30, and a telescoping-boom section 40. The rotating-boom section 46 may be coupled to the base 12 of the aerial lift system 10. The lower boom section 28 may be coupled to the rotating-boom section 46. The upper boom section 30 may be coupled to the lower boom section 28. The telescoping-boom section 40 may be coupled to the upper boom section 30. Additionally, or in the alternative, the telescoping-boom section 40 may define a portion of the upper boom section 30. The aerial lift system 10 may include a platform assembly 16 coupled to the boom assembly 14, such as to a respective boom section 22 of the boom assembly 14. For example, the platform assembly 16 may be coupled to the telescoping-boom section 40 and/or to the upper boom section 30 of the boom assembly 14. The boom assembly 14 may be operable to position the platform assembly 16 in proximity to a worksite 18, for example, by actuating one or more aerial lift actuator 26. By way of illustration, as shown in FIG. 1A, the worksite 18 may include various components associated with a utility system, such as an electrical power system. Some of the various components associated with the utility system may define obstacles 56, such power poles, cross-arms, power lines, transformers, and so forth. The one or more boom sections 22 of the boom assembly 14 may be selectively actuated to position the platform assembly 16 in proximity to the worksite 18, for example, while navigating around such obstacles 56. In some embodiments, one or more of the obstacles 56 may define a portion of the worksite 18. For example, work may be performed upon one or more of the obstacles 56.

Referring now to FIG. 1B, a platform assembly 16 is further described. As shown in FIG. 1B, a platform assembly 16 may include a workstation 58. The workstation 58 may be configured as a bucket, a basket, or the like, within which an operator may be situated, for example, when doing work such as moving the platform assembly 16 into proximity of the worksite 18 and/or performing tasks associated with the worksite 18. The workstation 58 may include a platform floor 60, and one or more sidewalls 62. The one or more sidewalls 62 may be configured to contain the operator within the workstation 58, for example, with the operator standing on the platform floor 60.

The platform assembly 16 may include one or more control consoles 64. The one or more control consoles 64 may respectively define a portion of the workstation 58 and/or the one or more control consoles 64 may be disposed adjacent to the workstation 58. Additionally, or in the alternative, the one or more control consoles 64 may be attached to the workstation 58. For example, as shown in FIG. 1B, one or more consoles 64 may be attached to a sidewall 62 of the workstation 58.

As shown in FIG. 1B, a control console 64 may include one or more control input apparatuses 66. In some embodiments, as shown, a control console 64 may include an apron 68 that at least partially surrounds the one or more control input apparatuses 66. An operator may reach into the apron 68, such as through an aperture 70 disposed about a top and/or side of the control console 64, to operate the one or more control input apparatuses 66. The apron 68 may include one or more apron-walls 72. The one or more apron walls 72 may be coupled to a sidewall 62 of the workstation 58. The aperture 70 of the apron 68 may be defined at least in part by the one or more apron walls 72 and/or at least in part by a sidewall 62 of the workstation 58.

In some embodiments, as shown, for example, in FIG. 1B, a platform assembly 16 may include a primary control console 74. The primary control console 74 may include a control input apparatus 66 configured to perform primary control operations associated with the aerial lift system 10. Such a control input apparatus 66 configured to perform primary control operations may sometimes be referred to as a primary control input apparatus 76. For example, a control input apparatus 66, such as the primary control input apparatus 76, may be configured to perform one or more control operations associated with the boom assembly 14. In some embodiments, A control input apparatus 66, such as the primary control input apparatus 76, may be configured to actuate one or more boom actuators 26, such as the lower boom actuator 34, the upper boom actuator 38, the telescoping-boom actuator 44, and/or the rotating boom actuator 50. The primary control input apparatus 76 may be actuated, for example, when doing work such as moving the platform assembly 16 into proximity of the worksite 18.

In some embodiments, as shown, for example, in FIG. 1B, a platform assembly 16 may include an auxiliary control console 78. The auxiliary control console 78 may include one or more control input apparatuses 66 configured to perform auxiliary control operations associated with the aerial lift system 10 and/or the one or more auxiliary systems 20. Additionally, or in the alternative, the primary control console 74 may include one or more control input apparatuses 66 configured to perform auxiliary control operations associated with the aerial lift system 10 and/or the one or more auxiliary systems 20. Such a control input apparatus 66 configured to perform auxiliary control operations may sometimes be referred to as an auxiliary control input apparatus 80. For example, a control input apparatus 66, such as an auxiliary control input apparatus 80, may be configured to operate one or more auxiliary systems 20, such as a robot, a hoist, a tool, a machine, or the like. The one or more auxiliary systems 20 may be operated, at least in part by actuating one or more auxiliary control input apparatuses 80, in association with doing work such as performing tasks associated with the worksite 18.

Figures 2A, 2B:
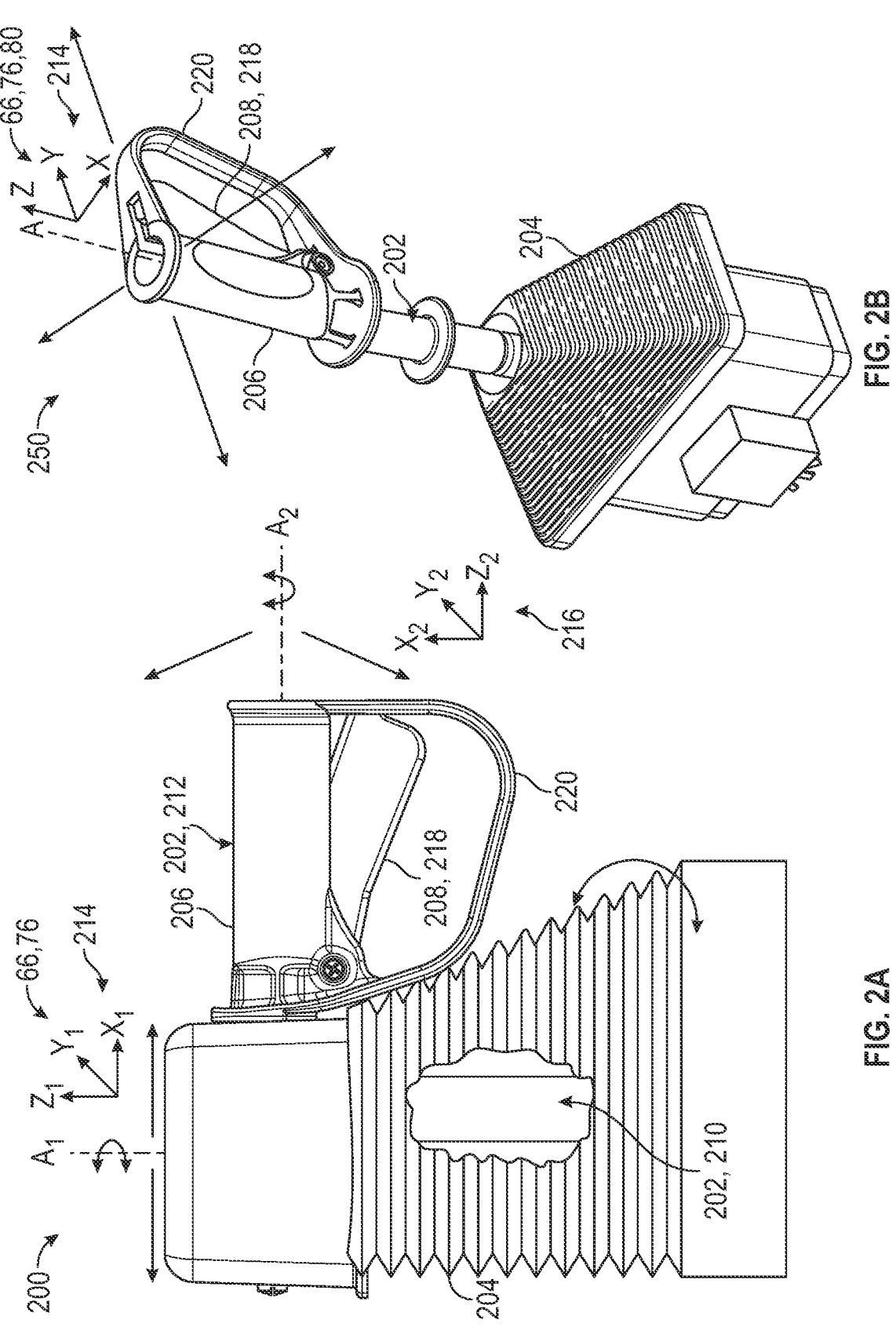
Figure 2C:
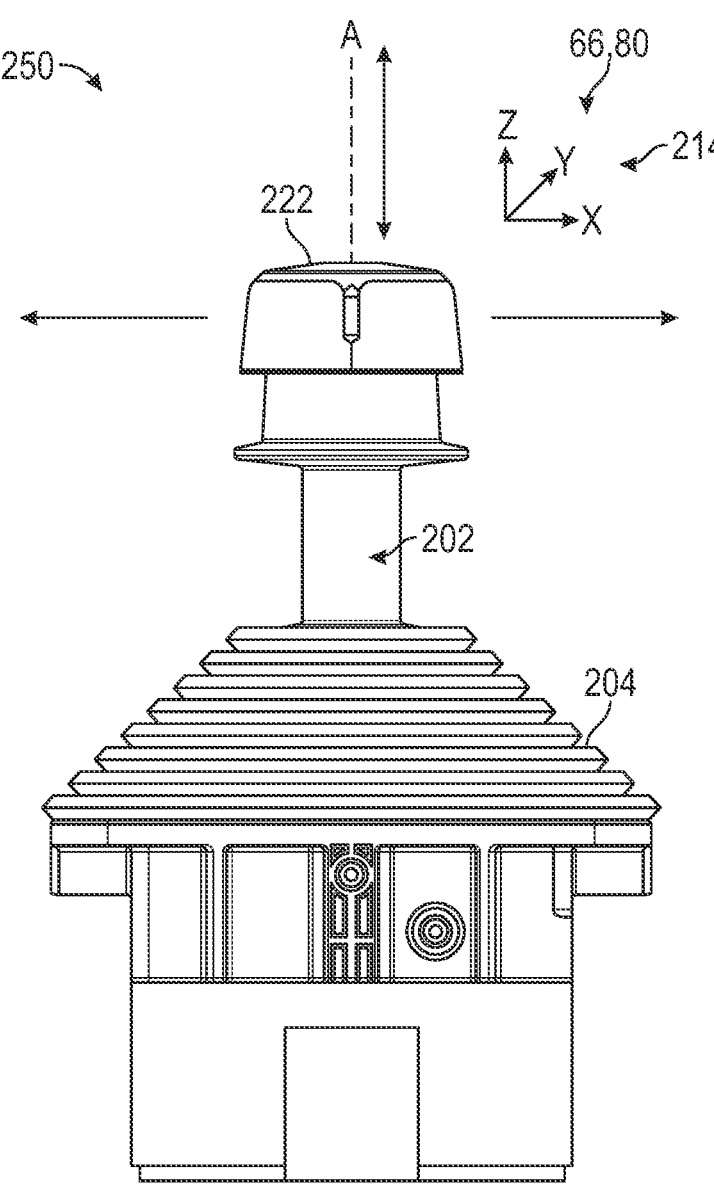

Now referring to FIGS. 2A-2C, example control input apparatuses 66 are further described. A control input apparatus 66 may be configured to impart control inputs that cause the aerial lift system 10 to move according to movements of the control inputs. Additionally, or in the alternative, a control input apparatus 66 may be configured to impart control inputs that cause the aerial lift system 10 and/or the one or more auxiliary systems 20 to perform one or more auxiliary control operations associated with the aerial lift system 10 and/or the one or more auxiliary systems 20.

A control input apparatus 66 may include a multi-axis control input apparatus 200 or a single-axis control input apparatus 250. As used herein, the term "multi-axis control input apparatus" refers to a control input apparatus 66 that has a plurality of control levers respectively configured to move in one or more directions relative to a corresponding references axis (A) defined by a longitudinal axis of the respectively corresponding control lever. As used herein, the term "single-axis control input apparatus" refers to a control input apparatus 66 that has one control lever assembly 202 configured to move in one or more directions relative to a references axis (A) defined by a longitudinal axis of the control lever.

As shown in FIGS. 2A-2C, a control input apparatus 66 may include one or more control lever assemblies 202. The one or more control lever assemblies 202 may be at least partially enclosed within a boot 204. A control lever assembly 202 may include a handle 206. The handle 206 may be sized to fit an operator's hand, such as while wearing a glove. In some embodiments, the handle 206 may include a rib pattern 207 (FIG. 3A) that provided improved grip, such as when wearing a glove, such as an electrical lineman glove.

A control input apparatus 66 and/or a control lever assembly 202 may be configured to move according to one or more modalities. A respective movement modality may be associated with a corresponding movement of the aerial lift system 10. For example, a control input apparatus 66 may be configured to actuate one or more boom actuators 26. Additionally, or in the alternative, a respective movement modality of the control input apparatus 66 may be associated with a corresponding an auxiliary control operation. In some embodiments, an auxiliary control operation may include actuating an interlock. The interlock may be associated with the auxiliary lift system 10 and/or one or more of the auxiliary systems 20. In some embodiments, a movement of the aerial lift system 10 and/or a control input corresponding to a movement of the aerial lift system 10 may be conditioned upon the interlock having been actuated. Additionally, or in the alternative, an auxiliary control operation and/or a control input corresponding to an auxiliary control operation may be conditioned upon the interlock having been actuated.

In some embodiments, a control lever assembly 202 may move forward and/or aft relative to the reference axis (A). Additionally, or in the alternative, the control lever assembly 202 may move left and/or right relative to the reference axis (A). Additionally, or in the alternative, the control lever assembly 202 may rotate about the reference axis (A), for example, within a range corresponding to a circular arc that has a specified arc length. Additionally, or in the alternative, the control lever assembly 202 may move longitudinally with respect to the reference axis (A), such as inward and/or outward, or up and/or down, with respect to the reference axis (A).

As shown in FIG. 2A, a control input apparatus 66, such as a multi-axis control input apparatus 200, may include a first-axis control lever assembly 210 configured to move in one or more directions relative to a first reference axis ($A_1$) defined by a first longitudinal axis of the first-axis control lever assembly 210. The control input apparatus 66, such as the multi-axis control input apparatus 200, may additionally include a second-axis control lever assembly 212 configured to move in one or more directions relative to a second reference axis ($A_2$) defined by a second longitudinal axis of the second-axis control lever assembly 212. As shown in FIG. 2A, the second-axis control lever assembly 212 may be coupled to the first-axis control lever assembly 210. In some embodiments, the first-axis control lever assembly 210 may be moved by way of the second-axis control lever assembly 212. In some embodiments, the control input apparatus 66 shown in FIG. 2A may depict a primary control input apparatus 76.

As shown in FIGS. 2B and 2C, in some embodiments, a control input apparatus 66, such as a single-axis control input apparatus 250, may include one or a single control lever assembly 202 configured to move in one or more directions relative to a reference axis (A) defined by a longitudinal axis of the control lever assembly 202. In some embodiments, the control input apparatus 66 shown in FIG. 2B may depict a primary control input apparatus 76 or an auxiliary control input apparatus 80. In some embodiments, the control input apparatus 66 shown in FIG. 2C may depict an auxiliary control input apparatus 80.

Referring to FIG. 2A, a control input apparatus 66, such as a multi-axis control input apparatus 200, may include a control lever assembly 202, such as a first-axis control lever assembly 210 configured to move forward and/or aft relative to the first reference axis ($A_1$). The forward and/or aft movement may correspond to an X-axis of a coordinate system 214, such as a first coordinate system associated with the control input apparatus 66. The first coordinate system 214 may be a cartesian coordinate system. In some embodiments, the control lever assembly 202 may additionally, or alternatively, be configured to move left and/or right relative to the first reference axis ($A_1$). The left and/or right movement may correspond to a Y-axis of the first coordinate system 214. In addition, or in the alternative, the first-axis control lever assembly 210 may be configured to rotate about the first reference axis ($A_1$). The first reference axis ($A_1$) may correspond to a Z-axis of the first coordinate system 214.

As shown in FIG. 2A, a control input apparatus 66, such as a multi-axis control input apparatus 200, may include a control lever assembly 202, such as a second-axis control lever assembly 212 configured to move forward and/or aft relative to the second reference axis ($A_2$). The forward and/or aft movement may correspond to an X-axis of a second coordinate system 216 associated with the control input apparatus 66. The second coordinate system 216 may be a cartesian coordinate system. In some embodiments, the control lever assembly 202 may additionally, or alternatively, be configured to move left and/or right relative to the second reference axis ($A_2$). The left and/or right movement may correspond to a Y-axis of the second coordinate system 216. In addition, or in the alternative, the second-axis control lever assembly 212 may be configured to rotate about the second reference axis ($A_2$). The second reference axis ($A_2$) may correspond to a Z-axis of the second coordinate system 216.

Referring to FIGS. 2B and 2C, a control input apparatus 66, such as a single-axis control input apparatus 250, may include a control lever assembly 202 configured to move in one or more directions relative to a reference axis, such as forward and/or aft relative to a reference axis (A). The forward and/or aft movement may correspond to an X-axis of a coordinate system 214 associated with the control input apparatus 66. Additionally, or in the alternative, as shown in FIG. 2B, the control lever assembly 202 may be configured to move left and/or right relative to the reference axis (A). The left and/or right movement may correspond to a Y-axis of the coordinate system 214. In some embodiments, the control lever assembly 202 may be configured to rotate about the reference axis (A). The reference axis (A) may correspond to a Z-axis of the coordinate system 214. Additionally, or in the alternative, as shown, for example, in FIG. 2C, a control input apparatus 66, such as a single-axis control input apparatus 250, may be configured to move longitudinally with respect to the reference axis (A), such as along the Z-axis of the coordinate system 214. The movement along the Z-axis may sometimes be referred to as an up and/or down movement, or as an in and/or out movement.

By way of illustration, the multi-axis control input apparatus 200 shown in FIG. 2A includes a first-axis control lever assembly 210 configured to move forward and aft relative to the first reference axis ($A_1$), and to rotate about the first reference axis ($A_1$), and a second-axis control lever assembly 212 configured to move forward and aft relative to the second reference axis ($A_2$), and to rotate about the second reference axis ($A_2$). The first-axis control lever assembly 210 and/or the second-axis control lever assembly 212 may be configured to move in one or more other directions in addition or in the alternative to those illustrated in FIG. 2A, such as a movement relative to a Y-axis and/or the Z-axis corresponding to the first reference axis ($A_1$) and/or the second reference axis ($A_2$). For example, a multi-axis control input apparatus 200 may be configured to move as described with reference to FIGS. 2B and 2C.

By way of illustration, the single-axis control input apparatus 250 shown in FIG. 2B may include a control lever assembly 202 configured to move along the X-axis and the Y-axis of the coordinate system 214 corresponding to the reference axis (A) of the control lever assembly 202. The control lever assembly 202 may be configured to move in one or more directions in addition or in the alternative to those illustrated in FIG. 2B, such as a movement along, and/or a rotation about, the Z-axis corresponding to the reference axis (A) of the control lever assembly 202. By way of further illustration, the single-axis control input apparatus 250 shown in FIG. 2C includes a control lever assembly 202 configured to move along the X-axis of the coordinate system 214 corresponding to the reference axis (A) of the control lever assembly 202. The control lever assembly 202 may be configured to move in one or more directions in addition or in the alternative to those illustrated in FIG. 2C, such as a movement along the Y-axis and/or the Z-axis, and/or a rotation about the Z-axis, corresponding to the reference axis (A) of the control lever assembly 202.

Referring further to FIGS. 2A-2C, in some embodiments, a control input apparatus 66 and/or a control lever assembly 202 may include one or more control input elements 208. The one or more control input elements 208 may be integrated into a control lever assembly 202 and/or a handle 206. The one or more control input elements 208 may be actuated by hand, such as by one or more fingers, thumb, or palm, of an operator. By way of example, a control input element 208 may include a trigger, a button (e.g., a push button and/or a pull button), a toggle, a switch, a dial, or the like.

In some embodiments, as shown in FIGS. 2A and 2B, the one or more control input elements 208 may include a trigger 218. As shown, the control lever assembly 202 and/or the handle 206 may include a trigger guard 220. The trigger guard 220 may wrap around the trigger 218 and/or around at least a portion of the handle 206. In some embodiments, the trigger guard may prevent inadvertent actuation of the trigger 218. Additionally, or in the alternative, the trigger guard 220 may ensure that an operator's hand is within suitable proximity to the trigger 218, for example, so that the trigger 218 may be properly actuated when the operator squeezes upon the trigger 218 and/or handle 206.

Additionally, or in the alternative, in some embodiments, as shown in FIG. 2B, the one or more control input elements 208 may include a button 222. The button 222 may be disposed about an endward portion of the control lever assembly 202. For example, the button 222 may define an endward face of the control lever assembly 202. The button 222 may be configured as a push button and/or as a pull button.

In some embodiments, a control input element 208, such as a trigger 218 and/or a button 222, may be operably and/or communicatively coupled to an interlock associated with the control input apparatus 66. Actuating the control input element 208, such as the trigger 218 or button 222, may release the interlock. As used herein with reference to an interlock, the term "release" refers to one or more actions imparted with respect to an interlock that allow one or more operations to be performed that would otherwise be prevented by the interlock from being performed. For example, releasing an interlock may include changing an interlock from a first state to a second state, such as from an engaged state to a disengaged state, or such as from an actuated state to a deactivated state. In some embodiments, the interlock may include a mechanical interlock. Additionally, or in the alternative, the interlock may include an electrical interlock, such as a hardwired interlock or a programmed interlock. One or more movement modalities, and/or one or more control inputs corresponding to a respective movement modality, may be associated with the interlock. Releasing the interlock may allow the control input apparatus 66 to move according to the one or more movement modalities associated with the interlock. Additionally, or in the alternative, releasing the interlock may allow movement of the control input apparatus 66 according to a movement modality to impart control inputs associated with the movement modality.

A multi-axis control input apparatus 200 may be configured to move according to one or more movement modalities associated with a first reference axis ($A_1$) and according to one or more movement modalities associated with a second reference axis ($A_2$). As an example, in some embodiments, a multi-axis control input apparatus 200 may be configured to move according to one movement modality associated with the first reference axis ($A_1$), and according to a plurality of movement modalities, such as two movement modalities, associated with the second reference axis ($A_2$). For example, the movement modality associated with the first reference axis ($A_1$) may include a forward and/or aft movement relative to the X-axis of a first coordinate system 214. The plurality of movement modalities associated with the second reference axis ($A_2$) may include a first movement modality that includes a forward and/or aft movement relative to the X-axis of a second coordinate system 216, and a second movement modality that includes a rotational movement relative to the Z-axis of the second coordinate system 216.

By way of example, in some embodiments, the forward and/or aft movement relative to the X-axis of the first coordinate system 214 associated with the first reference axis ($A_1$) may be configured to provide control inputs that impart a position and/or movement to the lower boom section 28 of an aerial lift system 10. The first movement modality associated with the second reference axis ($A_2$) (e.g., the forward and/or aft movement relative to the X-axis of the second coordinate system 216) may be configured to provide control inputs that impart a position and/or movement to the upper boom section 30 of the aerial lift system 10. The second movement modality associated with the second reference axis ($A_2$) (e.g., the rotational movement relative to the Z-axis of the second coordinate system 216) may be configured to provide control inputs that impart a position and/or movement to the rotating-boom section 46 of the aerial lift system 10.

As another example, in some embodiments, a multi-axis control input apparatus 200 may be configured to move according to a plurality of movement modalities, such as two movement modalities, associated with the first reference axis ($A_1$), and according to one movement modality associated with the second reference axis ($A_2$). For example, the plurality of movement modalities associated with the first reference axis ($A_1$) may include a first movement modality that includes a forward and/or aft movement relative to the X-axis of the first coordinate system 214, and a second movement modality that includes a rotational movement relative to the Z-axis of the first coordinate system 214. The movement modality associated with the second reference axis ($A_2$) may include a forward and/or aft movement relative to the X-axis of a second coordinate system 216.

By way of example, in some embodiments, the first movement modality associated with the first reference axis ($A_1$) (e.g., the forward and/or aft movement relative to the X-axis of the first coordinate system 214) may be configured to provide control inputs that impart a position and/or movement to the lower boom section 28 of the aerial lift system 10. The second movement modality associated with the first reference axis ($A_1$) (e.g., the rotational movement relative to the Z-axis of the first coordinate system 214) may be configured to provide control inputs that impart a position and/or movement to the rotating-boom section 46 of the aerial lift system 10. The forward and/or aft movement relative to the X-axis of the second coordinate system 216 associated with the second reference axis ($A_2$) may be configured to provide control inputs that impart a position and/or movement to the upper boom section 30 of an aerial lift system 10.

As yet another example, in some embodiments, a multi-axis control input apparatus 200 may be configured to move according to a plurality of movement modalities, such as two movement modalities, associated with the first reference axis ($A_1$), and according to a plurality of movement modalities such as two movement modalities, associated with the second reference axis ($A_2$). For example, the plurality of movement modalities associated with the first reference axis ($A_1$) may include a first movement modality that includes a forward and/or aft movement relative to the X-axis of the first coordinate system 214, and a second movement modality that includes a rotational movement relative to the Z-axis of the first coordinate system 214. The plurality of movement modalities associated with the second reference axis ($A_2$) may include a third movement modality that includes a forward and/or aft movement relative to the X-axis of the second coordinate system 216, and a fourth movement modality that includes a rotational movement relative to the Z-axis of the second coordinate system 216.

By way of example, in some embodiments, the first movement modality associated with the first reference axis ($A_1$) (e.g., the forward and/or aft movement relative to the X-axis of the first coordinate system 214) may be configured to provide control inputs that impart a position and/or movement to the lower boom section 28 of the aerial lift system 10. The second movement modality associated with the first reference axis ($A_1$) (e.g., the rotational movement relative to the Z-axis of the first coordinate system 214) may be configured to provide control inputs that impart a position and/or movement to the rotating-boom section 46 of the aerial lift system 10. The third movement modality associated with the second reference axis ($A_2$) (e.g., the forward and/or aft movement relative to the X-axis of the second coordinate system 216) may be configured to provide control inputs that impart a position and/or movement to the upper boom section 30 of the aerial lift system 10. The second movement modality associated with the second reference axis ($A_2$) (e.g., the rotational movement relative to the Z-axis of the second coordinate system 216) may be configured to provide control inputs that impart a position and/or movement to the telescoping-boom section 40 of the aerial lift system 10.

Figure 3B:
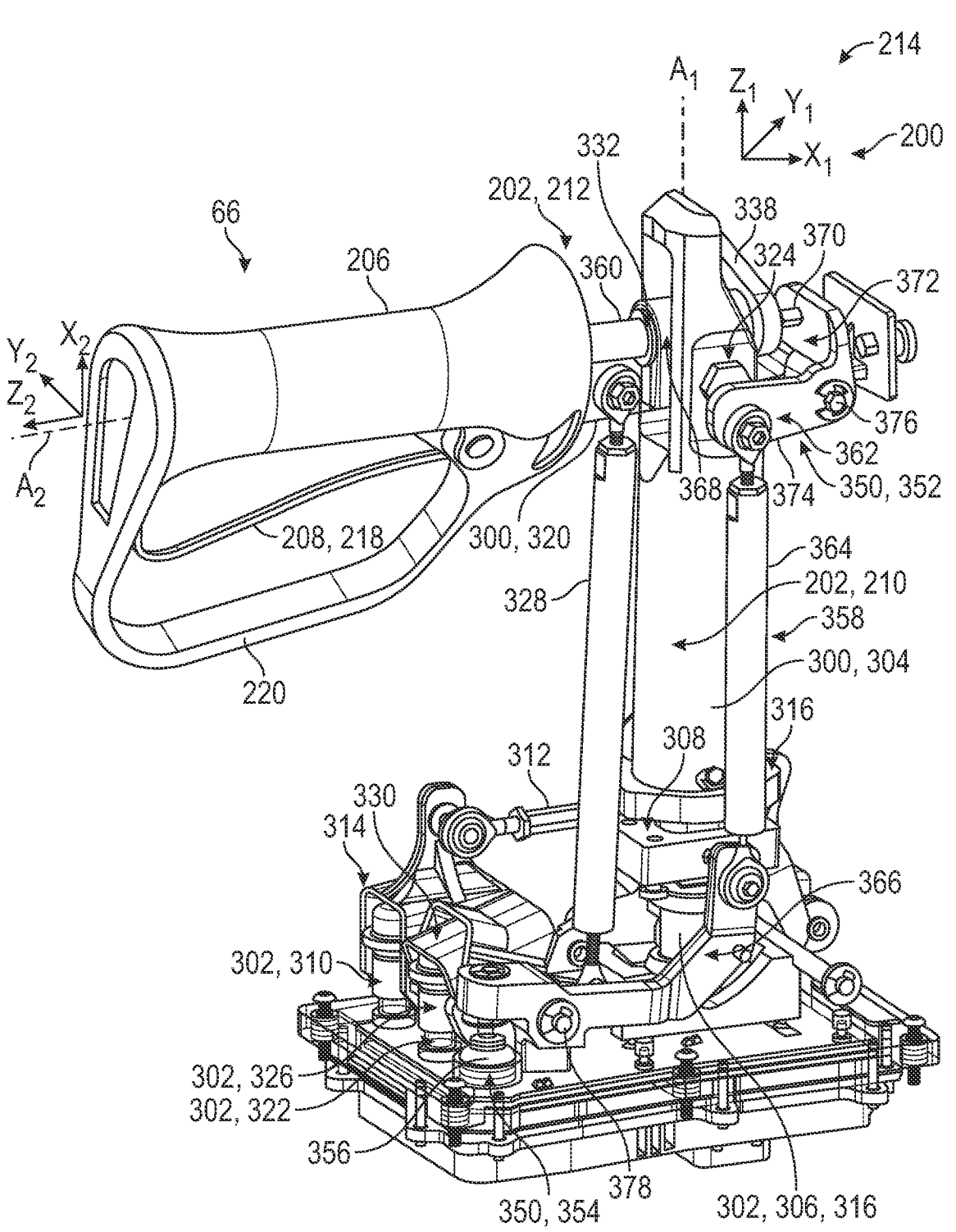

Referring now to FIGS. 3A and 3B, control input apparatuses 66 are further described. By way of example, the control input apparatus 66 shown in FIGS. 3A and 3B is a multi-axis control input apparatus 200. The features described with reference to FIGS. 3A and/or 3B may be incorporated into a single-axis control input apparatus 66. As shown, a multi-axis control input apparatus 200 may include a control lever assembly 202 that includes a first-axis control lever assembly 210 and a second-axis control lever assembly 212. A control lever assembly 202 may include at least one control lever 300 and at least one position sensor 302. For example, the first-axis control lever assembly 210 may include at least one control lever 300 and at least one position sensor 302. Additionally, or in the alternative, the second-axis control lever assembly 212 may include at least one control lever 300 and at least one position sensor 302. The control lever assembly 202 may include one or more electrically conductive components, and the control input apparatus 66 may nevertheless exhibit a high electrical resistance. For example, the at least one at least one control lever 300 may include one or more electrically conductive components. Additionally, or in the alternative, the at least one position sensor 302 may include one or more electrically conductive components.

As shown, the first-axis control lever assembly 210 may include at least one first-axis control lever 304 and at least one first-axis position sensor 306. The first-axis control lever 304 may be configured to move forward and/or aft relative to the X-axis of the first coordinate system 214. The first-axis control lever 304 may be configured to rotate about the Z-axis of the first coordinate system 214. The at least one first-axis position sensor 306 may be configured to determine a movement and/or a position corresponding to the first-axis control lever 304. In some embodiments, one or a single first-axis position sensor 306 may be configured to determine a movement and/or a position of the first-axis control lever 304 corresponding to the X-axis and/or the Z-axis. In some embodiments, a plurality of respectively distinct first-axis position sensors 306 may be configured to determine a corresponding directional movement and/or position of the first-axis control lever 304.

In some embodiments, the first-axis control lever 304 may translate about a first-X-axis pivot point 308. A first-X-axis position sensor 310 may be configured to determine a movement and/or a position of the first-axis control lever 304 corresponding to the X-axis, such as a forward and/or aft movement or position relative to the X-axis. The forward and/or aft movement of the first-axis control lever 304 may be translated to the first-X-axis position sensor 310 at least in part by a first-X-axis connecting rod 312. The first-X-axis position sensor 310 may be actuated at least in part by a first-X-axis rocker 314. At least one of the first-X-axis position sensor 310 and the first-X-axis rocker 314 may include an electrical conductor, or may be formed of an electrically conductive material, such as a metal or a metal alloy. The first-X-axis connecting rod 312 may be formed of a dielectric material. In some embodiments, the first-axis control lever 304 may translate about a first-Z-axis pivot point 316. A first-Z-axis position sensor 318 may be configured to determine a movement and/or a position of the first-axis control lever 304 corresponding to the Z-axis, such as a rotational movement or position relative to the Z-axis. The translation about the first-Z-axis pivot point 316 may be in addition, or in the alternative, to the translation about the first-X-axis pivot point 308.

As further shown in FIGS. 3A and 3B, the second-axis control lever assembly 212 may include at least one second-axis control lever 320 and at least one second-axis position sensor 322. The second-axis control lever 320 may be configured to move forward and/or aft relative to the X-axis of the second coordinate system 216. The second-axis control lever 320 may be configured to rotate about the Z-axis of the second coordinate system 216. The at least one second-axis position sensor 322 may be configured to determine a movement and/or a position corresponding to the second-axis control lever 320. In some embodiments, one or a single second-axis position sensor 322 may be configured to determine a movement and/or a position of the second-axis control lever 320 corresponding to the X-axis and/or the Z-axis. In some embodiments, a plurality of respectively distinct second-axis position sensors 322 may be configured to determine a corresponding directional movement and/or position of the second-axis control lever 320.

In some embodiments, the second-axis control lever 320 may translate about a second-X-axis pivot point 324. A second-X-axis position sensor 326 may be configured to determine a movement and/or a position of the second-axis control lever 320 corresponding to the X-axis, such as a forward and/or aft movement or position relative to the X-axis. The forward and/or aft movement of the second-axis control lever 320 may be translated to the second-X-axis position sensor 326 at least in part by a second-X-axis connecting rod 328. The second-X-axis position sensor 326 may be actuated at least in part by a second-x-axis rocker 330. At least one of the second-X-axis position sensor 326 and the second-x-axis rocker 330 may include an electrical conductor, or may be formed of an electrically conductive material, such as a metal or a metal alloy. In some embodiments, the second-axis control lever 320 may translate about a second-Z-axis pivot point 332. A second-Z-axis position sensor 334 may be configured to determine a movement and/or a position of the second-axis control lever 320 corresponding to the Z-axis, such as a rotational movement or position relative to the Z-axis. The rotational movement of the second-axis control lever 320 may be translated to the second-Z-axis position sensor 334 at least in part by a second-Z-axis connecting rod 336. The second-axis control lever 320 may be coupled to the second-Z-axis connecting rod 336 by a second-Z-axis linkage element 338. The second-Z-axis position sensor 334 may be actuated at least in part by a second-Z-axis rocker 340. The translation about the second-Z-axis pivot point 332 may be in addition, or in the alternative, to the translation about the second-X-axis pivot point 324.

As shown in FIGS. 3A and 3B, the multi-axis control input apparatus 200 may include a handle 206 coupled to the second-axis control lever 320. The handle 206 may be operable to move the second-axis control lever 320 and/or the first-axis control lever 304. For example, a force applied upon the handle 206 along the X-axis of the first coordinate system 214 may actuate the first-X-axis position sensor 310. Additionally, or in the alternative, a rotational force applied upon the handle 206 about the Z-axis of the first coordinate system 214 may actuate the first-Z-axis position sensor 318. The rotational force applied upon the handle 206 along the Z-axis of the first coordinate system 214 may correspond or equate to a force applied upon the handle 206 along the Y-axis of the second coordinate system 216. Additionally, or in the alternative, a force applied upon the handle 206 along the X-axis of the second coordinate system 216 may actuate the second-X-axis position sensor 326. Additionally, or in the alternative, a rotational force applied upon the handle 206 about the Z-axis of the second coordinate system 216 may actuate the second-Z-axis position sensor 334.

Referring further to FIGS. 3A and 3B, a control input apparatus 66, such as a multi-axis control input apparatus 200, may include an interlock system 350. The interlock system 350 may include at least one control input element 208. The interlock system 350 may include a mechanical interlock 352 and/or an electrical interlock 354. A mechanical interlock 352 may include one or more mechanical elements that may be situated in an engaged position or a disengaged position. In the engaged position, the mechanical interlock 352 may prevent movement of the control input apparatus 66 according to one or more movement modalities to impart control inputs associated with the movement modality. The mechanical interlock 352 may be released (e.g., moved from the engaged position to the disengaged position) by actuating a control input element 208, such as a trigger 218. In the disengaged position, the mechanical interlock 352 may allow the control input apparatus 66 to move according to the one or more movement modalities, such as responsive to a force imparted to the handle 206. The movements may impart control inputs associated with the movement modality, such as control inputs operable to move the aerial lift system 10 and/or to perform an auxiliary control operation.

An electrical interlock 354 may include one or more electrical elements that may generate an interlock signal indicating an engaged position and/or a disengaged position. By way of example, an electrical interlock 354 may include at least one interlock sensor 356. In some embodiments, the at least one interlock sensor 356 may include an interlock switch, such as a normally-closed/normally-open switch (NC/NO switch). Additionally, or in the alternative, the interlock sensor 356 may be or may include a position sensor 302. For example, the at least one interlock sensor 356 may include an interlock switch, such as an NC/NO switch, and a position sensor 302, such as a Hall effect sensor.

In the engaged position, the electrical interlock 354 may prevent control inputs from being imparted in association with movements of the control input apparatus 66. The electrical interlock 354 may be released (e.g., moved from the engaged position to the disengaged position) by actuating the control input element 208, such as the trigger 218. In the disengaged position, the electrical interlock 354 may allow movements of the control input apparatus 66 to impart control inputs associated with the movement modality, such as control inputs operable to move the aerial lift system 10 and/or to perform an auxiliary control operation. In some embodiments, the mechanical interlock 352 may prevent the electrical interlock 354 from being moved to the disengaged position. Additionally, or in the alternative, the electrical interlock 354 may be moved from the engaged position to the disengaged position when the mechanical interlock 352 is in the disengaged position, such as after the mechanical interlock 352 has been moved to the disengaged position. In some embodiments, the mechanical interlock 352 and the electrical interlock 354 may be moved from the engaged position to the disengaged position concurrently or simultaneously.

The interlock system 350 may include at least one control input element 208, such as the trigger 218. The control input element 208 may be configured to release the mechanical interlock 352 and/or the electrical interlock 354. The control input element 208 may be at least partially integrated into the control lever assembly 202. As shown, the control input element 208, such as the trigger 218, may be at least partially integrated into the second-axis control lever 320 and/or into the handle 206 coupled to the second-axis control lever 320. The control input element 208 may actuate the interlock sensor 356, for example, to release the electrical interlock 354 that allows movement of the control input apparatus 66 to impart control inputs operable to move the aerial lift system 10 and/or to perform an auxiliary control operation.

As shown in FIGS. 3A and 3B, the interlock system 350 may include an interlock linkage assembly 358. The interlock linkage assembly 358 may include at least a portion of the first-axis control lever assembly 210 and/or at least a portion of the second-axis control lever assembly 212. The interlock linkage assembly 358 may include one or more of: an interlock plunger 360, an interlock rocker 362, an interlock connecting rod 364, and an interlock swingarm 366. The interlock linkage assembly 358 may additionally include the control input element 208, such as the trigger 218.

Actuating the control input element 208 may translate the interlock plunger 360. The interlock plunger 360 may translate, for example, longitudinally, relative to the second reference axis ($A_2$) defined by the second longitudinal axis of the second-axis control lever assembly 212. The translation of the interlock plunger 360 may correspond to the X-axis of the first coordinate system 214 and/or to the Z-axis of the second coordinate system 216. The interlock plunger 360 may be supported at least in part by a plunger coupling 368. The plunger coupling 368 may be coupled to, or may define a portion of, the second-axis control lever 320. In some embodiments, the plunger coupling 368 may include, or may be defined at least in part by, the second-Z-axis pivot point 332. The interlock plunger 360 may slidably translate through the second-axis control lever 320. Additionally, or in the alternative, the second-axis control lever 320 may include the interlock plunger 360. In some embodiments, the second-Z-axis linkage element 338 may be coupled to the interlock plunger 360. The interlock plunger 360 may translate about the second-Z-axis pivot point 332 to actuate the second-X-axis position sensor 326.

The interlock plunger 360 may include a plunger pin 370 configured to impart a force upon the interlock rocker 362. The interlock rocker 362 may include a rocker plate 372 and a rocker arm 374. The interlock rocker 362 may pivot about a rocker pivot 376. The plunger pin 370 may push against the rocker plate 372 as the interlock plunger 360 translates responsive to actuating the control input element 208, such as the trigger 218. Interaction of the plunger pin 370 with the rocker plate 372 may cause the interlock rocker 362 to pivot about the rocker pivot 376, thereby moving the rocker arm 374.

The interlock connecting rod 364 may couple the interlock rocker 362, such as the rocker arm 374, to the interlock swingarm 366. The interlock connecting rod 364 may translate movement of the interlock rocker 362 to the interlock swingarm 366. The interlock swingarm 366 may pivot about a swingarm pivot 378. Movement of the interlock swingarm 366 may cause the interlock swingarm 366 to actuate the interlock sensor 356. At least one of the interlock swingarm 366 and the interlock sensor 356 may include an electrical conductor, or may be formed of an electrically conductive material, such as a metal or a metal alloy. Additionally, or in the alternative, at least one of the interlock swingarm 366 and the interlock sensor 356 may include, or may be formed of, one or more dielectric materials.

Referring now to FIGS. 4A-4E, control input apparatuses 66 are further described. A control input apparatus 66, such as a multi-axis control input apparatus 200 or a single-axis control input apparatus 250, may include a control input modulator 400. As used herein, the term "control input modulator" refers to a control input element that is configured to modulate command values of control inputs imparted by a control input apparatus 66 based at least in part on a position of the control input element 208. The control input modulator 400 may include at least one control input element 208 and at least one position sensor 302. In some embodiments, the at least one position sensor 302 of the control input element 208 may be, or may include, an interlock sensor 356. Additionally, or in the alternative, an interlock sensor 356 and a control input modulator 400 may be configured to work in concert with one another. For example, a control input element 208, such as a trigger 218, may release an interlock (e.g., a mechanical interlock 352 and/or an electrical interlock 354) and also may modulate command values of control inputs imparted by a control input apparatus 66.

A control input modulator 400 may modulate the command values of control inputs corresponding to one or more position sensors 302 of a control input apparatus 66, such as one or more position sensors 302 associated with a control lever assembly 202 and/or a control lever 300 of the control input apparatus 66. Additionally, or in the alternative, a control input modulator 400 may modulate the command values of control inputs corresponding to one or more control input elements 208 of the control input apparatus 66.

In some embodiments, a control input modulator 400 may modulate the command values of control inputs imparted by a control lever assembly 202, such as control inputs imparted by moving the control lever assembly 202 according to one or more movement modalities. For example, a command value of a control input imparted by the control lever assembly 202 may relate to (e.g., may be proportional to) a position of the control input modulator 400, such as a position indicated by a position sensor 302 of the control input modulator 400. The control inputs may be provided by a first position sensor 302 that is actuated by a corresponding movement modality of the control lever assembly 202. The command values of the control inputs may be modulated by the control input modulator, such as by a second position sensor 302 that is actuated by moving a control input element 208 of the control input modulator 400. For example, the command values may relate to (e.g., may be proportional to) a position of the second position sensor 302. Additionally, or in the alternative, a control input modulator 400 may modulate command values of control inputs imparted by a control input element 208. For example, command values of the control inputs imparted by the control input element 208 may relate to (e.g., may be proportional to) a position of the control input element 208 and/or a position sensor corresponding to the control input element 208. Additionally, or in the alternative, command values of the control inputs imparted by a first position sensor 302 corresponding to a first control input element 208 may relate to (e.g., may be proportional to) a position of a second position sensor 302 that is actuated by moving a control input element 208 of the control input modulator 400.

In some embodiments, as shown in FIG. 4A, a control input modulator 400 and/or a control input element 208 may be configured as a trigger 218. The trigger 218 may include a longitudinal chamfer 219 disposed about a distal portion of the trigger 218. The longitudinal chamfer 219 may improve an operator's ability to grip of the trigger 218, for example, by reducing the distance between the handle 206 and the trigger 218 about the distal portion of the trigger 218. Additionally, or in the alternative, the longitudinal chamfer 219 may shift the operator's grip towards the medial or proximal portion of the trigger 218. In some embodiments, an operator may have improved fine motor control of the trigger 218 when operating the trigger 218 at the medial or proximal portion.

In some embodiments, as shown in FIG. 4B, a control input modulator 400 and/or a control input element 208 may be configured as a button 402. As shown, the button 402 may include a push-button modality. Additionally, or in the alternative the button 402 may include a pull-button modality. In some embodiments, a control input modulator 400 may be configured as a button 402 that includes a push-button and a pull-button modality.

As shown in FIGS. 4A and 4B, a control input element 208, such as a control input modulator 400, may be moved and/or actuated from an actuation range between a non-actuated position 404 and a fully-actuated position 406. The non-actuated position 404 may correspond to 0% position with respect to a movement range from 0% to 100%. The fully-actuated position 406 may correspond to a 100% position with respect to the movement range of from 0% to 100%. The control input modulator 400 may be non-actuated at a non-actuated position 404, such as at a position of 0%. The control input modulator 400 may be fully-actuated at a fully-actuated position 406, such as at a position of 100%. In some embodiments, the control input modulator 400 may be at least partially-actuated at an actuation threshold position (A$_T$) 408. In some embodiments, an interlock, such as a mechanical interlock and/or an electrical interlock may be released at an interlock release threshold. The interlock release threshold may correspond to the actuation threshold position (A$_T$) 408. The control input modulator 400 may modulate command values based at least in part on a position of the control input modulator from the interlock release threshold, such as the actuation threshold position (A$_T$) 408, to the fully-actuated position 406. The interlock release threshold and/or the actuation threshold position (A$_T$) 408 may be selectively located at a suitable position between the non-actuated position 404 and the fully-actuated position 406. By way of example, the actuation threshold position (A$_T$) 408 may be located at a position of from 20% to 80% of the movement range, such as from 25% to 75%, such as from 20% to 50%, such as from 40% to 60%, such as from 50% to 80%, or such as from 60% to 80%.

In some embodiments, actuating the control input element 208, such as the control input modulator 400, at least to the actuation threshold position (A$_T$) 408 may release an interlock, such as a mechanical interlock 352 and/or an electrical interlock 354. For example, an interlock sensor 356 may be actuated when the control input modulator 400 passes the actuation threshold position (A$_T$) 408. The interlock sensor 356 may include an interlock switch, such as a normally-closed/normally-open switch (NC/NO switch). The interlock switch, such as the NC/NO switch may be actuated at the actuation threshold position (A$_T$) 408. The control input element 208, such as the control input modulator 400, may be configured to actuate one or more position sensors 302 associated with the control input apparatus 66 and/or the control input element 208 when the control input modulator 400 is actuated, and/or remains actuated, at least to the actuation threshold position (A$_T$) 408, such as within an actuation range defined from the actuation threshold position (A$_T$) 408 to the fully-actuated position 406. Additionally, or in the alternative, the one or more position sensors 302 associated with the control input apparatus 66 and/or the control input element 208 may be configured to provide a control input corresponding to a movement of the control input apparatus 66 when the control input element 208, such as the control input modulator 400, is actuated and/or remains actuated at least to the actuation threshold position (A$_T$) 408, such as within the actuation range defined from the actuation threshold position (A$_T$) 408 to fully-actuated position 406. By requiring the control input modulator to be actuated past the actuation threshold position (A$_T$) 408, inadvertent engagement of the control input apparatus 66 and/or control input element 208 may be avoided. For example, when the control input modulator 400 is associated with an interlock system 350, an inadvertent release of an interlock system 350 may be avoided. Additionally, or in the alternative, when the control input modulator 400 is associated with an operation of the control input apparatus 66 and/or a control input element 208, an inadvertent actuation of the control input apparatus 66 and/or a control input element 208 may be avoided.

In some embodiments, a control input modulator 400 may provide a control input upon the control input modulator 400 having been moved to at least the actuation threshold position (A$_T$) 408. Additionally, or in the alternative, a control input may have a command value of greater than zero (0) when the control input modulator 400 is actuated to at least the actuation threshold position (A$_T$) 408. The command value of a control input may depend at least in part on a position of the control input modulator 400, such as a position between the actuation threshold position (A$_T$) 408 and the fully-actuated position 406.

By way of example, as shown in FIG. 4C, in some embodiments, a control input modulator 400, and/or a movement modality of a control lever assembly 202 associated with a control input modulator 400, may provide a command value when the control input modulator 400 is moved to at least the actuation threshold position (A$_T$) 408. In some embodiments, the command value may depend at least in part on a modulation curve 410 that correlates command values to the position of the control input modulator 400. The modulation curve 410 may intersect the actuation threshold (A$_T$) 408. The modulation curve 410 may define a relationship, such as a proportional relationship, between a position of the control input modulator 400 and the command values of corresponding control inputs. The modulation curve 410 may include a linear curve and/or a nonlinear curve. For example, the slope of the modulation curve 410 may depend at least in part on the position of the control input modulator 400. Additionally, or in the alternative, in some embodiments, a control input modulator 400 may provide an "on/off" modulation. With an on/off modulation, the control input modulator 400, and/or the movement modality of the control lever assembly 202 associated with a control input modulator 400, may provide a constant command value 412 when the control input modulator 400 is moved to at least the actuation threshold position (A$_T$) 408. A constant command value 412 may be an unmodulated value, such as a command value corresponding to 100%. Additionally, or in the alternative, a constant command value 412 may be a modulated value, such as a value greater than 0% and less than 100%.

In some embodiments, a control input modulator 400 may be configured to release an interlock, such as a mechanical interlock 352 and/or an electrical interlock 354. For example, the mechanical interlock 352 and/or the electrical interlock 354 may be released upon the control input modulator 400 having been moved to at least the actuation threshold position (A$_T$) 408. Upon the mechanical interlock 352 and/or the electrical interlock 354 having been released, such as with the control input modulator 400 moved to the actuation threshold position (A$_T$) 408, the control input modulator 400 may provide a constant command value 412 and/or the control input modulator 400 may provide command values that depend at least in part on a position of the control input modulator, such as a position between the actuation threshold position (A$_T$) 408 and the fully-actuated position 406.

Referring now to FIGS. 4D and 4E, modulated command values are further described. As shown in FIG. 4D, command values may be modulated based at least in part on a time factor. Additionally, or in the alternative, as shown in FIG. 4E, command values may be modulated based at least in part on a position factor. The time factor may modulate a command value with respect to time based at least in part on a position of the control input modulator 400.

The time modulation, such as shown in FIG. 4D, may be determined based at least in part on a time modulation curve that correlates a time modulation to a position of the control input apparatus 66 and/or the control input modulator 400. For example, one or more movement modalities of a control lever assembly 202 may be modulated according to the time factor and/or the time modulation curve. The time factor and/or the time modulation curve may correlate a time modulation to a position of the control input apparatus 66 and/or the control input modulator 400. For example, one or more movement modalities of a control lever assembly 202 may be modulated according to the time factor and/or the time modulation curve. The time factor and/or the time modulation curve may define a relationship, such as a proportional relationship, between a position of control input apparatus 66 and/or the control input modulator 400 and a time modulation applied to command values of corresponding control inputs. The time modulation curve may include a linear curve and/or a nonlinear curve. For example, the slope of the time modulation curve may depend at least in part on the position of the control input apparatus 66 and/or the control input modulator 400. By way of example, Position A shown in FIG. 4D may have a relatively long time-modulation and/or Position B may have a relatively short time-modulation. By way of example, Position A shown in FIG. 4D may correspond to the control input apparatus 66 and/or the control input modulator 400 at a fully-actuated position 406. Additionally, or in the alternative, Position B shown in FIG. 4D may correspond to a control input apparatus 66 and/or a control input modulator 400 that is partially actuated, such as at least to an actuation threshold position ($A_T$) 408.

The position modulation, such as shown in FIG. 4E, may be determined based at least in part on a position factor and/or a position modulation curve. The position factor and/or the position modulator curve may correlate a position modulation to a position of the control input apparatus 66 and/or the control input modulator 400. For example, one or more movement modalities of a control lever assembly 202 may be modulated according to the position factor and/or the position modulation curve. The position factor and/or the position modulation curve may define a relationship, such as a proportional relationship, between a position of the control input apparatus 66 and/or the control input modulator 400 and a position modulation applied to command values of corresponding control inputs. The position modulation curve may include a linear curve and/or a nonlinear curve. For example, the slope of the position modulation curve may depend at least in part on the position of the control input apparatus 66 and/or the control input modulator 400. By way of example, Position A shown in FIG. 4D may have a relatively small position-modulation and/or Position B may have a relatively large position-modulation. By way of example, Position A shown in FIG. 4D may correspond to the control input apparatus 66 and/or the control input modulator 400 at a fully-actuated position 406. Additionally, or in the alternative, Position B shown in FIG. 4D may correspond to a control input apparatus 66 and/or a control input modulator 400 that is partially actuated, such as at least to an actuation threshold position ($A_T$) 408. As shown in FIGS. 4D and 4E, a modulation may be applied to a beginning and/or an end of a movement associated with a control input.

A control input modulator 400 may modulate command values of the control inputs corresponding to one or more movement modalities of a control lever assembly 202. In some embodiments, the modulation curve 410 may differ as between respective movement modalities of the control lever assembly 202 and/or as between control inputs corresponding to the control input modulator 400 and control inputs corresponding to one or more movement modalities of the control lever assembly 202.

By way of example, a control input modulator 400 may modulate one or more movement modalities associated with the first reference axis ($A_1$), and one or more movement modalities associated with the second reference axis ($A_2$) may be unmodulated. In some embodiments, the control input modulator 400 may modulate a first movement modality that includes a forward and/or aft movement relative to the X-axis of the first coordinate system 214, and/or a second movement modality that includes a rotational movement relative to the Z-axis of the first coordinate system 214, and the one or more movement modalities associated with the second reference axis ($A_2$) may be unmodulated.

As another example, a control input modulator 400 may modulate one or more movement modalities associated with the second reference axis ($A_2$), and one or more movement modalities associated with the first reference axis ($A_1$) may be unmodulated. In some embodiments, the control input modulator 400 may modulate a first movement modality that includes a forward and/or aft movement relative to the X-axis of the second coordinate system 216, and/or a second movement modality that includes a rotational movement relative to the Z-axis of the second coordinate system 216, and the one or more movement modalities associated with the first reference axis ($A_1$) may be unmodulated.

As another example, a control input modulator 400 may modulate one or more movement modalities associated with the first reference axis ($A_1$), and one or more movement modalities associated with the second reference axis ($A_2$). In some embodiments, the control input modulator 400 may modulate a first movement modality that includes a forward and/or aft movement relative to the X-axis of the first coordinate system 214, and a second movement modality that includes a forward and/or aft movement relative to the X-axis of the second coordinate system 216. In some embodiments, the control input modulator 400 may modulate a third movement modality that includes a rotational movement relative to the Z-axis of the first coordinate system 214, and a fourth movement modality that includes a rotational movement relative to the Z-axis of the second coordinate system 216. In some embodiments, the control input modulator 400 may modulate the first movement modality that includes the forward and/or aft movement relative to the X-axis of the first coordinate system 214, and the fourth movement modality that includes the rotational movement relative to the Z-axis of the second coordinate system 216. In some embodiments, the control input modulator 400 may modulate the second movement modality that includes the forward and/or aft movement relative to the X-axis of the second coordinate system 216, and the third movement modality that includes the rotational movement relative to the Z-axis of the first coordinate system 214.

A time-modulation may include a modulation to time delay to initiate a movement, a velocity associated with initiating the movement, and/or an acceleration rate associated with initiating the movement. For example, a control input such as actuating a control lever 300 with the control input modulator 400 at the fully-actuated position 406 may have a relatively small time-modulation. Additionally, or in the alternative, a control input such as actuating a control lever 300 with the control input modulator 400 at a partially-actuated position, such as a position between the actuation threshold position ($A_T$) 408 and the fully-actuated position 406 may have a relatively large time-modulation. As another example, a control input such as de-actuating (e.g., releasing, reversing, etc.) a control lever 300 with the with the control input modulator 400 at the fully-actuated position 406 may have a relatively small time-modulation. Additionally, or in the alternative, a control input such as de-actuating (e.g., releasing, reversing, etc.) a control lever 300 with the with the control input modulator 400 at a partially-actuated position, such as a position between the actuation threshold position ($A_T$) 408 and the fully-actuated position 406 may have a relatively large time-modulation. A relatively small time-modulation may correspond to a relatively short time delay, a relatively fast velocity, and/or a relatively large acceleration rate. Thus, when an operator desires a movement without delay, a fast movement, and/or a fast acceleration rate, the control input modulator may be actuated to the fully-actuated position 406. A relatively large time-modulation may correspond to a relatively long time delay, a relatively slow velocity, and/or a relatively small acceleration rate. Thus, when an operator desires a delayed movement delay, a slow movement, and/or a slow acceleration rate, the control input modulator 400 may be actuated to a partially actuated position.

A position-modulation may include a modulation to an increment or distance associated with a control input. For example, a control input such as actuating a control lever 300 with the control input modulator 400 at the fully-actuated position 406 may have a relatively small position-modulation. Additionally, or in the alternative, a control input such as actuating a control lever 300 with the control input modulator 400 at a partially-actuated position, such as a position between the actuation threshold position ($A_T$) 408 and the fully-actuated position 406 may have a relatively large position-modulation. As another example, a control input such as de-actuating (e.g., releasing, reversing, etc.) a control lever 300 with the with the control input modulator 400 at the fully-actuated position 406 may have a relatively small position-modulation. Additionally, or in the alternative, a control input such as de-actuating (e.g., releasing, reversing, etc.) a control lever 300 with the with the control input modulator 400 at a partially-actuated position, such as a position between the actuation threshold position ($A_T$) 408 and the fully-actuated position 406 may have a relatively large position-modulation. A relatively large position-modulation may correspond to a relatively small increment or distance associated with the control input. Thus, when an operator desires a movement with a large increment or distance, the control input modulator 400 may be actuated to the fully-actuated position 406. A relatively small position-modulation may correspond to a relatively large increment or distance associated with the control input. Thus, when an operator desires a movement with a small increment or distance, the control input modulator 400 may be actuated to a partially actuated position.

Referring now to FIGS. 5A-5G, position sensors 302 are further described. As shown in FIGS. 5A-5C, a position sensor 302 may include one or more position sensing elements 500 and one or more force metering elements 502. The one or more position sensing elements 500 may be configured to sense a position and/or a rate of change of a control lever assembly 202 and/or a control input element 208. The one or more force metering elements 502 may be configured to impart a force profile to one or more movement modalities of the control lever assembly 202 and/or control input element 208 corresponding to the respective one or more position sensing elements 500.

In some embodiments, a control input apparatus 66 may include one or more position sensors 302 and/or one or more position sensing elements 500 that operate at least in part according to the Hall effect. The one or more position sensors 302 and/or the one or more position sensing elements 500 may respectively include, or may be configured as, a Hall effect sensor 504. As used herein, the term "Hall effect sensor" refers to a sensor that detects a magnetic field and/or one or more properties of the magnetic field using the Hall effect. For example, a Hall effect sensor may sense one or more of the following properties of a magnetic field: flux density, polarity, intensity of a magnetic field. As used herein, the term "Hall effect" refers to voltage difference across an electrical conductor induced by a magnetic field. The voltage difference may be transverse to an electric current in the electrical conductor, and the magnetic field may be perpendicular to the electric current. A Hall effect sensor 504 may provide an output signal relating to (e.g., proportional to) a strength of the magnetic field and/or relating to (e.g., proportional to) a strength of one or more properties of the magnetic field. A Hall effect sensor 504 may be configured to determine a position and/or a rate of change of a control lever assembly 202 and/or a control input element 208. A command value corresponding to a position sensor 302 may relate to (e.g., may be proportional to) an output signal from the position sensor 302, such as the Hall effect sensor 504. The output signal may indicate a position and/or a rate of change.

The Hall effect sensor 504 may be electrically conductive and/or may include one or more electrically conductive components. The electrical conductivity associated with the Hall effect sensor 504 may be attributable at least in part to the electrical conductor across which the voltage difference is induced by the magnetic field. Additionally, or in the alternative, the electrical conductivity associated with the Hall effect sensor 504 may be attributable at least in part to the one or more magnets 508 that provide the magnetic field. In accordance with the present disclosure, a control input apparatus 66 may exhibit a high electrical resistance notwithstanding the electrically conductive nature of the Hall effect sensors 504.

In addition, or in the alternative to the Hall effect, a control input apparatus 66 may include one or more position sensors 302 and/or one or more position sensing elements 500 that operate according to one or more other position sensing modalities. For example, in addition, or in the alternative to a Hall effect sensor 504, the one or more position sensors 302 and/or the one or more position sensing elements 500 may include, or may be configured as, at least one of: an accelerometer, a capacitive displacement sensor, an eddy-current sensor, an inductive sensor, a laser Doppler vibrometer, a Linear variable differential transformer, a photodiode sensor, a piezo-electric sensor, a position encoder (e.g., an absolute encoder, an incremental encoder, a linear encoder, or a rotary encoder), a potentiometer, a proximity sensor, a string potentiometer, or an ultrasonic sensor, as well as combinations of these. In some embodiments, the one or more position sensors 302 may include a Hall effect sensor 504. In some embodiments, the one or more position sensors 302 may include a potentiometer. In some embodiments, the one or more position sensors 302 may include a Hall effect sensor 504, and the interlock system 350 may be fully releasable by actuating an electrical interlock 354. In some embodiments, the interlock system 350 may include only an electrical interlock 354, without a mechanical interlock 352. In some embodiments, the one or more position sensors 302 may include a potentiometer, and the interlock system 350 may be releasable by actuating both a mechanical interlock 352 and an electrical interlock 354.

As shown in FIGS. 5A-5C, a Hall effect sensor 504 may include an actuator element 506, one or more magnets 508 and a Hall element 510. The one or actuator elements 506 may move the one or more magnets 508 relative to the Hall element 510 and/or the Hall element 510 relative to the one or more magnets 508. As shown in FIGS. 5D-5G, a Hall effect sensor 504 may sense a movement and/or rate of change in one, two, or three dimensions. For example, as shown in FIG. 5D, a Hall effect sensor 504 may sense a linear movement modality, such as a forward and/or aft movement, a left and/or right movement. As another example, as shown in FIG. 5E, a Hall effect sensor 504 may sense a linear movement modality, such as an up and/or down movement, or an in and/or out movement. As another example, as shown in FIG. 5F, a Hall effect sensor 504 may sense a rotational movement modality. In some embodiments, as shown in FIG. 5F, in addition to a rotational movement modality, a Hall effect sensor 504 may sense a linear movement modality, such as a forward and/or aft movement, a left and/or right movement, an up and/or down movement, or an in and/or out movement. As another example, as shown in FIG. 5G, a Hall effect sensor 504 may sense a three-dimensional movement modality, such as a gimbal movement modality (e.g., a forward and/or aft movement, and a left and/or right movement), and a transverse movement modality (e.g., an in and/or out movement, and/or an up and/or down movement).

The one or more force metering elements 502 may include an elastic object, such as a spring, an elastomer, or the like. Additionally, or in the alternative, the one or more force metering elements 502 may include a damper, such as a fluidic damper. The one or more force metering elements 502 may include one or more components formed of a metal or metal alloy. For example, an elastic object, such as a spring, and/or the damper, may be formed of a metal or a metal alloy. The one or more force metering elements 502 may meter one or more characteristics of a respective movement modality of a corresponding control lever assembly 202 and/or control input element 208, including a force profile for actuating movement of the corresponding control lever assembly 202 and/or control input element 208, and/or a force profile for a return movement of the corresponding control lever assembly 202 and/or control input element 208. The one or more characteristics may include an actuation force profile and/or a return force profile. The force profile may include a preload parameter and/or a damping parameter. The one or more force metering elements 502 may be selectively configured at least in part to meter one or more characteristics of a respective movement modality, such as to impart a force profile to the respective movement modality, of a control lever assembly 202 and/or a control input element 208.

Referring now to FIGS. 6A-6D, movement modalities of control lever assemblies 202 and/or control input elements 208 are further described. As shown in FIGS. 6A-6D, a movement modality of a control lever assembly 202 and/or a control input element 208 may move according to a movement curve 600. The movement curve 600 may exhibit one or more movement characteristics that depend at least in part on a position along a movement curve corresponding to the movement modality. For example, a force associated with moving a control lever assembly 202 and/or a control input element 208 according to the movement modality may increase with increasing position along the movement curve corresponding to the movement modality. The movement curve 600 may exhibits a relationship between force and position. A relationship between a position along the movement curve and a force associated with holding the position along the movement curve may sometimes be referred to herein as a force profile. The movement curve 600 may include a linear force profile and/or a nonlinear force profile.

As shown in FIG. 6A, a movement curve 600 may include an actuation curve 602 and a return curve 604. The actuation curve 602 may include a first force profile and the return curve 604 may include a second force profile that differs from the first force profile. For example, as shown, a first force corresponding to the actuation curve 602 at a given position may be greater than a second force corresponding to the return curve 604 at the given position. All or a portion of the positions along the actuation curve 602 may have a force value that exceeds the force value of the return curve 604 at a corresponding position of the return curve 604. In some embodiments, a first force profile corresponding to the actuation curve 602 may be imparted at least in part by a first force metering element 502 and a second force profile corresponding to the return curve 604 may be imparted at least in part by a second force metering element 502. By way of example, as shown in FIGS. 3A and 5A, a position sensor 302 corresponding to the first-X-axis position sensor 310 may include an actuation force-metering element 606, and a return force-metering element 608.

Referring still to FIG. 6A, a movement modality of a control lever assembly 202 and/or a control input element 208 may include a movement curve 600 that has a force profile that exceeds a proprioception threshold 610. The proprioception threshold 610 may correspond to a force value and/or a force profile selected to allow an operator to sense a movement, action, or position with respect to the movement modality, for example, while the operator is wearing a glove, such as an electrical lineman glove. The force value and/or the force profile corresponding to the proprioception threshold 610 may be selected to allow the operator to sense a movement, action, or position with respect to an initial position 612, and/or an initial movement from the initial position 612, corresponding to the movement modality.

Additionally, or in the alternative, the movement curve 600 may have a force profile that exceeds a determinate actuation threshold 614. The determinate actuation threshold 614 may correspond to a force value and/or a force profile selected to require an operator to impart an intentional force with respect to the movement modality for the control lever assembly 202 and/or a control input element 208. Additionally, or in the alternative, the determinate actuation threshold 614 may correspond to a force value and/or a force profile selected to avoid accidental movement of the control lever assembly 202 and/or a control input element 208. The determinate actuation threshold 614 may be selected based at least in part on an operator wearing a glove, such as an electrical lineman glove. The force value and/or the force profile corresponding to the determinate actuation threshold 614 may be selected to require an operator to impart an intentional force with respect to an initial position 612, and/or an initial movement from the initial position 612, corresponding to the movement modality.

Additionally, or in the alternative, the movement curve 600 may have a force profile determined based at least in part on a strain threshold 616. The strain threshold 616 may correspond to a force value and/or a force profile that causes an operator to experience exposure that would exceed a threshold limit value with respect to the movement modality for the control lever assembly 202 and/or a control input element 208. The movement curve 600 may include a force profile that remains below the strain threshold 616. The strain threshold 616 may be selected based at least in part on an operator wearing a glove, such as an electrical lineman glove. The force value and/or the force profile corresponding to the strain threshold 616 may be selected to allow an operator to remain below the strain threshold 616 when imparting a force with respect to a terminus position 618, and/or a movement approaching the terminus position 618, corresponding to the movement modality.

In some embodiments, one or more characteristics of the respective movement modality may be selected based at least in part on one or more ergonomic factors and/or one or more kinesthetic factors. The one or more ergonomic factors associated with a movement modality may include increasing accuracy of movements imparted by an operator, reducing errors in movements imparted by the operator, increase productivity, enhancing safety, increasing operator comfort, reducing operator fatigue, and so forth. The one or more kinesthetic factors associated with a movement modality may include improving neuromotor control, improving neuroplasticity, improving motor redundancy, and so forth.

In some embodiments, one or more ergonomic factors and/or one or more kinesthetic factors may be improved at least in part by combining a control input modulator 400 with a force metering element 502. For example, an operator may utilize fine motor movements to actuate a control input modulator 400 and gross motor movements to move a control lever assembly 202 according to a respective movement modality. The gross motor movements utilized to move the control lever assembly 202 according to the respective movement modality may be modulated by the fine motor movements utilized to actuate the control input modulator 400. The one or more ergonomic factors and/or kinesthetic factors may be improved by modulating gross motor movements with fine motor movement.

As shown in FIG. 6A, in some embodiments, at least a portion of the actuation curve 602, such as the entirety of the actuation curve 602, may have force values that are greater than corresponding force values of the return curve 604. In some embodiments, the actuation curve 602 may include an abrupt increase in force at the terminus position 618. The abrupt increase in force may provide a sensation of a "hard stop" at the terminus position 618. The abrupt increase in force may provide a clear indication to the operator that the terminus position 618 has been reached.

The actuation curve 602 may have an initial force value 620 corresponding to the initial position 612, and a terminus force value 622 corresponding to the terminus position 618. In some embodiments, the initial force value 620 may correspond to the determinate actuation threshold 614. For example, as shown in FIG. 6A, the initial force value 620 may be equal to or greater than the determinate actuation threshold 614, such as from 1% to 50% greater than the determinate actuation threshold 614, or such as from 5% to 20% greater than the determinate actuation threshold 614. As shown in FIG. 6A, the terminus force value 622 is less than the strain threshold 616.

The return curve 604 may have an initial return force value 624 that is less than the terminus force value 622. The initial return force value 624 may be greater than the initial force value 620, such as from 1% to 30% greater than the initial force value 620, or such as from 5% to 15% greater than the initial force value 620. Additionally, or in the alternative, the initial return force value 624 may be greater than the determinate actuation threshold 614, such as from 1% to 100% greater than the determinate actuation threshold 614, or such as from 10% to 50% greater than the determinate actuation threshold 614. In some embodiments, a terminal return force value 626 of the return curve 604 may correspond to the proprioception threshold 610. For example, the terminal return force value 626 may be equal to or greater than the proprioception threshold 610, such as from 1% to 100% greater than the proprioception threshold 610, such as from 5% to 50% greater than the proprioception threshold 610, or such as from 25% to 75% greater than the proprioception threshold 610.

A movement curve 600 for a control lever assembly 202 and/or a control input element 208, such as an actuation curve 602 and/or a return curve 604, and or such as a force profile and/or force values thereof, may be determined based at least in part on operator testing. The operator testing may include ergonomic assessment and/or kinesthetic assessment. The ergonomic assessment may include an assessment of one or more ergonomic factors. The kinesthetic assessment may include an assessment of one or more kinesthetic factors. The operator testing may be performed according to standard testing protocols. The operator testing may be performed based at least in part on the respective movement modalities of the control lever assembly 202 and/or control input element 208 and/or based at least in part on operator duty cycles for the respective movement modalities associated with tasks to be performed at a worksite 18.

Referring now to FIGS. 6B-6D, example movement curves 600 associated with respective movement modalities of a control lever assembly 202 are further described. As shown in FIGS. 6B and 6C, a control input apparatus 66, such as a multi-axis control input apparatus 200, may include one or more movement modalities that have a movement curve 600. The movement curve 600 may include a force profile that includes a relationship between a position along the movement curve 600 and a force associated with holding the position along the movement curve 600. The force profile may include one or more positions along the movement curve 600 in which the force associated with holding the position along the movement curve 600 increases with increasing position, such as between at least a portion of a range increasing from the initial position 612 to the terminus position 618. Additionally, or in the alternative, the one or more movement modalities may have a movement curve 600 that has a force profile in which the force associated with holding a position along the movement curve decreases with decreasing position, such as between at least a portion of a range decreasing from the terminus position 618 to the initial position 612. As shown in FIG. 6D, a control input apparatus 66, such as a single-axis control input apparatus 250, may include one or more movement modalities that have a movement curve 600 that has a force profile in which the force associated with holding a position on the movement curve increases with increasing position, such as between at least a portion of a range increasing from the initial position 612 to the terminus position 618, and/or such as between at least a portion of a range decreasing from the terminus position 618 to the initial position 612.

As shown in FIG. 6B, a first movement modality corresponding to a first X-axis 628 of a first coordinate system 214, such as a forward movement, may have a first X-axis actuation curve 628*a* and a first X-axis return curve 628*b*. A second movement modality corresponding to the first X-axis 628 of the first coordinate system 214, such as an aft movement, may have a second X-axis actuation curve 628*c* and a second X-axis return curve 628*d*. The first movement modality corresponding to the first X-axis actuation curve 628*a* may include a pushing movement imparted by an operator, such as by an arm of the operator. The first movement modality corresponding to the first X-axis return curve 628b may include a pulling movement imparted by the operator, such as by the arm of the operator. The second movement modality corresponding to the second X-axis actuation curve 628c may include a pulling movement imparted by the operator, such as by the arm of the operator. The second movement modality corresponding to the second X-axis return curve 628d may include a pushing movement imparted by the operator, such as by the arm of the operator.

A first movement modality corresponding to a Z-axis 630 of the first coordinate system 214, such as a clockwise rotational movement, may have a first Z-axis actuation curve 630a and a first Z-axis return curve 630b. A second movement modality corresponding to the first Z-axis 630 of the first coordinate system 214, such as a counterclockwise rotational movement, may have a second Z-axis actuation curve 630c and a second Z-axis return curve 630d. The first Z-axis actuation curve 630a may include a clockwise twisting movement imparted by an operator, such as by an arm of the operator. The first Z-axis return curve 630b may include a counterclockwise twisting movement imparted by the operator, such as by the arm of the operator. The second Z-axis actuation curve 630c may include a counterclockwise twisting movement imparted by the operator, such as by the arm of the operator. The second Z-axis return curve 630d may include a clockwise twisting movement imparted by the operator, such as by the arm of the operator.

In some embodiments, as shown in FIG. 6B, the first X-axis actuation curve 628a may have an initial force value 620 that is greater than an initial force value 620 of the second X-axis actuation curve 628c. The second X-axis actuation curve 628c may have a terminus force value 622 that is greater than a terminus force value 622 of the first X-axis actuation curve 628a. The second X-axis actuation curve 628c may have a slope that is greater than a slope of the first X-axis actuation curve 628a. In some embodiments, the first X-axis return curve 628b and the second X-axis return curve 628d may have substantially equivalent an initial return force value 624, and/or a substantially equivalent terminal return force value 626. In some embodiments, one or more differences between the force profiles of the first movement modality and the second movement modality corresponding to the first X-axis 628 of the first coordinate system 214 may be provided based at least in part to accommodate one or more differences between pushing movements and pulling movements imparted by the operator, such as a difference between one or more ergonomic factors and/or between one or more kinesthetic factors associated with such pushing movements and/or pulling movements.

In some embodiments, as shown in FIG. 6B, the first Z-axis actuation curve 630a may have an initial force value 620 that is greater than an initial force value 620 of the second Z-axis actuation curve 630c. The second Z-axis actuation curve 630c may have a terminus force value 622 that is greater than a terminus force value 622 of the first X-axis actuation curve 628a. The second Z-axis actuation curve 630c may have a slope that is greater than a slope of the first Z-axis actuation curve 630a. In some embodiments, the first Z-axis return curve 630b may have an initial return force value 624 that is greater than an initial return force value 624 of the second Z-axis return curve 630d. The first Z-axis return curve 630b may have a terminal return force value 626 that is greater than a terminal return force value 626 of the second Z-axis return curve 630d. The second Z-axis return curve 630d may have a slope that is greater than a slope of the first Z-axis return curve 630b. In some embodiments, one or more differences between the force profiles of the first movement modality and the second movement modality corresponding to the first Z-axis 630 of the first coordinate system 214 may be provided based at least in part to accommodate one or more differences between inward twisting movements and outward twisting movements imparted by the operator, such as a difference between one or more ergonomic factors and/or between one or more kinesthetic factors associated with such inward twisting movements and/or outward twisting movements.

In some embodiments, the first X-axis actuation curve 628a may have an initial force value 620 that is greater than an initial force value 620 of the first Z-axis actuation curve 630a. The first X-axis actuation curve 628a may have a terminus force value 622 that is greater than a terminus force value 622 of the first Z-axis actuation curve 630a. The first Z-axis actuation curve 630a may have a slope that is greater than a slope of the first X-axis actuation curve 628a. In some embodiments, the first X-axis return curve 628b may have an initial return force value 624 that is less than an initial return force value 624 of the first Z-axis return curve 630b. The first X-axis return curve 628b may have a terminal return force value 626 that is substantially equivalent to a terminal return force value 626 of the first Z-axis return curve 630b. The first X-axis return curve 628b may have a slope that is less than a slope of the first Z-axis return curve 630b.

In some embodiments, the second X-axis actuation curve 628c may have an initial force value 620 that is greater than an initial force value 620 of the second Z-axis actuation curve 630c. The second X-axis actuation curve 628c may have a terminus force value 622 that is greater than a terminus force value 622 of the second Z-axis actuation curve 630c. The second Z-axis actuation curve 630c may have a slope that is greater than a slope of the second X-axis actuation curve 628c. In some embodiments, the second X-axis return curve 628d may have an initial return force value 624 that is less than an initial return force value 624 of the second Z-axis return curve 630d. The second X-axis return curve 628d may have a terminal return force value 626 that is greater than a terminal return force value 626 of the second Z-axis return curve 630d. The second X-axis return curve 628d may have a slope that is less than a slope of the second Z-axis return curve 630d.

In some embodiments, one or more differences between the force profiles of the movement modalities corresponding to the first X-axis 628 of the first coordinate system 214 and the movement modalities corresponding to the first Z-axis 630 of the first coordinate system 214 may be provided based at least in part to accommodate one or more differences between pushing/pulling movements and inward/outward twisting movements imparted by the operator, such as a difference between one or more ergonomic factors and/or between one or more kinesthetic factors associated with such movements.

As shown in FIG. 6C, a third movement modality corresponding to an X-axis 632 of a second coordinate system 216, such as an upward movement modality, may have a third X-axis actuation curve 632a and a third X-axis return curve 632b. A fourth movement modality corresponding to the second X-axis 632 of the second coordinate system 216, such as a downward movement modality, may have a fourth X-axis actuation curve 632c and a fourth X-axis return curve 632d. The third movement modality corresponding to the third X-axis actuation curve 632a may include a lifting movement imparted by an operator, such as by an arm of the operator. The third movement modality corresponding to the third X-axis return curve 632b may include a lowering movement imparted by the operator, such as by the arm of the operator. The fourth movement modality corresponding to the fourth X-axis actuation curve 632c may include a lowering movement imparted by the operator, such as by the arm of the operator. The fourth movement modality corresponding to the fourth X-axis return curve 632d may include a lifting movement imparted by the operator, such as by the arm of the operator.

A third movement modality corresponding to a Z-axis 634 of the second coordinate system 216, such as a clockwise rotational movement, may have a third Z-axis actuation curve 634a and a third Z-axis return curve 634b. A fourth movement modality corresponding to the second Z-axis 634 of the second coordinate system 216, such as a counter-clockwise rotational movement, may have a fourth Z-axis actuation curve 634c and a fourth Z-axis return curve 634d. The third Z-axis actuation curve 634a may include a clock-wise twisting movement imparted by an operator, such as by a wrist of the operator. The third Z-axis return curve 634b may include a clockwise twisting movement imparted by the operator, such as by the wrist of the operator. The fourth Z-axis actuation curve 634c may include a clockwise twist-ing movement imparted by the operator, such as by the wrist of the operator. The fourth Z-axis return curve 634d may include a counterclockwise twisting movement imparted by the operator, such as by the wrist of the operator.

In some embodiments, as shown in FIG. 6C, the third X-axis actuation curve 632a may have an initial force value 620 that is substantially equal to an initial force value 620 of the fourth X-axis actuation curve 632c. The third X-axis actuation curve 632a may have a terminus force value 622 that is greater than a terminus force value 622 of the fourth X-axis actuation curve 632c. The third X-axis actuation curve 632a may have a slope that is greater than a slope of the fourth X-axis actuation curve 632c. In some embodi-ments, the third X-axis return curve 632b may have an initial return force value 624 that is less than an initial return force value 624 of the fourth X-axis return curve 632d. The third X-axis return curve 632b may have a terminal return force value 626 that is less than a terminal return force value 626 of the fourth X-axis return curve 632d. In some embodi-ments, one or more differences between the force profiles of the third movement modality and the fourth movement modality corresponding to the second X-axis 632 of the second coordinate system 216 may be provided based at least in part to accommodate one or more differences between lifting movements and lowering movements imparted by the operator, such as a difference between one or more ergonomic factors and/or between one or more kinesthetic factors associated with such lifting movements and/or lowering movements.

In some embodiments, as shown in FIG. 6C, the third Z-axis actuation curve 634a may have an initial force value 620 that is greater than an initial force value 620 of the fourth Z-axis actuation curve 634c. The fourth Z-axis actua-tion curve 634c may have a terminus force value 622 that is greater than a terminus force value 622 of the third Z-axis actuation curve 634a. The fourth Z-axis actuation curve 634c may have a slope that is greater than a slope of the third Z-axis actuation curve 634a. In some embodiments, the third Z-axis return curve 634b may have an initial return force value 624 that is greater than an initial return force value 624 of the fourth Z-axis return curve 634d. The third Z-axis return curve 634b may have a terminal return force value 626 that is greater than a terminal return force value 626 of the fourth Z-axis return curve 634d. The third Z-axis return curve 634b may have a slope that is greater than a slope of the fourth Z-axis return curve 634d. In some embodiments, one or more differences between the force profiles of the third movement modality and the fourth movement modality corresponding to the second Z-axis 634 of the second coordinate system 216 may be provided based at least in part to accommodate one or more differences between inward twisting movements and outward twisting movements imparted by the operator, such as a difference between one or more ergonomic factors and/or between one or more kinesthetic factors associated with such inward twisting movements and/or outward twisting movements.

In some embodiments, the third X-axis actuation curve 632a may have an initial force value 620 that is greater than an initial force value 620 of the third Z-axis actuation curve 634a. The third X-axis actuation curve 632a may have a terminus force value 622 that is greater than a terminus force value 622 of the third Z-axis actuation curve 634a. The third Z-axis actuation curve 634a may have a slope that is greater than a slope of the third X-axis actuation curve 632a. In some embodiments, the third X-axis return curve 632b may have an initial return force value 624 that is greater than an initial return force value 624 of the third Z-axis return curve 634b. The third X-axis return curve 632b may have a terminal return force value 626 that is greater than a terminal return force value 626 of the third Z-axis return curve 634b. The third X-axis return curve 632b may have a slope that is greater than a slope of the third Z-axis return curve 634b.

In some embodiments, the fourth X-axis actuation curve 632c may have an initial force value 620 that is greater than an initial force value 620 of the fourth Z-axis actuation curve 634c. The fourth X-axis actuation curve 632c may have a terminus force value 622 that is greater than a terminus force value 622 of the fourth Z-axis actuation curve 634c. The fourth Z-axis actuation curve 634c may have a slope that is greater than a slope of the fourth X-axis actuation curve 632c. In some embodiments, the fourth X-axis return curve 632d may have an initial return force value 624 that is greater than an initial return force value 624 of the fourth Z-axis return curve 634d. The fourth X-axis return curve 632d may have a terminal return force value 626 that is greater than a terminal return force value 626 of the fourth Z-axis return curve 634d. The fourth X-axis return curve 632d may have a slope that is greater than a slope of the fourth Z-axis return curve 634d.

In some embodiments, one or more differences between the force profiles of the movement modalities corresponding to the second X-axis 632 of the second coordinate system 216 and the movement modalities corresponding to the second Z-axis 634 of the second coordinate system 216 may be provided based at least in part to accommodate one or more differences between lifting/lowering movements and inward/outward twisting movements imparted by the opera-tor, such as a difference between one or more ergonomic factors and/or between one or more kinesthetic factors associated with such movements.

In some embodiments, one or more differences between the force profiles of the movement modalities corresponding to the first X-axis 628 of the first coordinate system 214 and the second X-axis 632 of the second coordinate system 216 may be provided based at least in part to accommodate one or more differences between pushing and lifting movements, and/or differences between puling and lowering movements, imparted by the operator. Additionally, or in the alternative, one or more differences between the force profiles of the movement modalities corresponding to the first Z-axis 630 of the first coordinate system 214 and the second Z-axis 634 of the second coordinate system 216 may be provided based at least in part to accommodate one or more differences between twisting movements imparted by an arm of the operator, and twisting movements imparted by a wrist of the operator.

As shown in FIG. 6D, a control input apparatus 66, such as a single-axis control input apparatus 250, may include a fifth movement modality 636 that, for example, includes a forward movement, and a sixth movement modality 638 that, for example, includes an aft movement. The fifth movement modality may have a fifth actuation curve 636a and a fifth return curve 636b. The sixth movement modality may have a sixth actuation curve 638a and a sixth return curve 638b. The fifth movement modality corresponding to the fifth actuation curve 636a may include a pushing movement imparted by an operator, such as by an arm of the operator. The fifth movement modality corresponding to the fifth return curve 636b may include a pulling movement imparted by the operator, such as by the arm of the operator. The sixth movement modality corresponding to the sixth actuation curve 638a may include a pulling movement imparted by the operator, such as by the arm of the operator. The sixth movement modality corresponding to the sixth return curve 638b may include a pushing movement imparted by the operator, such as by the arm of the operator.

In some embodiments, as shown in FIG. 6D, the fifth actuation curve 636a may have an initial force value 620 that is less than an initial force value 620 of the sixth actuation curve 638a. The fifth actuation curve 636a may have a terminus force value 622 that is greater than a terminus force value 622 of the sixth actuation curve 638a. The sixth actuation curve 638a may have a slope that is greater than a slope of the fifth actuation curve 636a. In some embodiments, the fifth return curve 636b may have an initial return force value 624 that is less than an initial return force value 624 of the sixth return curve 638b. The fifth return curve 636b may have a terminal return force value 626 that is less than a terminal return force value 626 of the sixth return curve 638b. In some embodiments, one or more differences between the force profiles of the fifth movement modality and the sixth movement modality corresponding to the fifth X-axis 628 of the fifth coordinate system 214 may be provided based at least in part to accommodate one or more differences between pushing movements and pulling movements imparted by the operator, such as a difference between one or more ergonomic factors and/or between one or more kinesthetic factors associated with such pushing movements and/or pulling movements.

In some embodiments, a force profile of an actuation curve 602 may include a terminus force value 622 determined based at least in part on one or more ergonomic factors and/or one or more kinesthetic factors. The first X-axis actuation curve 628a associated with the first movement modality corresponding to the X-axis 628 of the first coordinate system 214, such as a forward movement, may have a terminus force value 622 of from 40 to 50 Newton (N), such as from 44 to 46 N. The second X-axis return curve 628d associated with the second movement modality corresponding to the X-axis 628 of the first coordinate system 214, such as an aft movement, may have a terminus force value 622 of from 25 to 35 N, such as from 30 to 32 N. The first Z-axis actuation curve 630a associated with the first movement modality corresponding to the Z-axis 630 of the first coordinate system 214, such as a clockwise rotational movement, may have a terminus force value 622 of from 10 to 20 N, such as from 14 to 16 N. The second Z-axis actuation curve 630c associated with the second movement modality corresponding to the Z-axis 630 of the first coordinate system 214, such as a counterclockwise rotational movement, may have a terminus force value 622 of from 10 to 20 N, such as from 14 to 16 N.

The third X-axis actuation curve 632a associated with the third movement modality corresponding to the X-axis 632 of the second coordinate system 216, such as an upward movement, may have a terminus force value 622 of from 40 to 50 Newton (N), such as from 44 to 46 N. The fourth X-axis return curve 632c associated with the fourth movement modality corresponding to the X-axis 632 of the second coordinate system 216, such as a lowering movement, may have a terminus force value 622 of from 35 to 45 N, such as from 39 to 41 N. The third Z-axis actuation curve 634a associated with the third movement modality corresponding to the Z-axis 634 of the second coordinate system 216, such as a clockwise rotational movement, may have a terminus force value 622 of from 6 to 15 N, such as from 10 to 12 N. The fourth Z-axis actuation curve 634c associated with the fourth movement modality corresponding to the Z-axis 630 of the second coordinate system 216, such as a counterclockwise rotational movement, may have a terminus force value 622 of from 6 to 15 N, such as from 10 to 12 N.

Referring now to FIGS. 7A-7F, control input apparatuses 66, including multi-axis control input apparatuses 200 and single-axis control input apparatuses 250, are further described. The presently disclosed control input apparatuses 66 may exhibit a high electrical resistance. In some embodiments the control input apparatus 66 may include one or more dielectric components 700. One or more components of the control input apparatus 66 may include, or may be formed of, one or more dielectric materials. A high electrical resistance exhibited by a control input apparatus 66 may be attributable at least in part to one or more components of the control input apparatus 66 being formed of, or including, one or more dielectric materials.

As shown in FIG. 7A, a multi-axis control input apparatus 200 may include one or more dielectric components 700. As shown in FIGS. 7B and 7C, a single-axis control input apparatus 250 may include one or more dielectric components 700. Referring, for example, to FIGS. 7A, in some embodiments, a control lever assembly 202 of a control input apparatus 66, such as a first-axis control lever assembly 210 and/or a the second-axis control lever assembly 212, may include one or more dielectric components 700. The control lever assembly 202 may include at least one control lever 300 that is, or that includes one or more dielectric components 700. The at least one control lever 300 may be formed of one or more dielectric materials. For example, as shown in FIG. 7A, the one or more dielectric components 700 may include a first-axis control lever 304 and/or a second-axis control lever 320. Additionally, or in the alternative, the one or more dielectric components 700 may include at least one of: a first-X-axis connecting rod 312, a second-X-axis connecting rod 328, a second-Z-axis connecting rod 336, or an interlock connecting rod 364.

As shown in FIGS. 7A-7C, in some embodiments, the one or more dielectric components 700 may include a handle 206 and/or a control input element 208, such as a trigger 218 (and/or a trigger guard 220), or a button 402. Additionally, or in the alternative, the control lever assembly 202 may include an interlock system 350 that includes one or more dielectric components 700. The interlock system 350 may include an interlock linkage assembly 358 that includes one or more dielectric components 700. For example, the one or more dielectric components 700 may include at least one of:

an interlock plunger 360, an interlock rocker 362, an interlock connecting rod 364, or an interlock swingarm 366.

Referring to FIGS. 7A-7C, in some embodiments, a control lever assembly 202 may include one or more dielectrically-coated components 702 that are coated with and/or encapsulated within one or more dielectric materials. The one or more dielectrically-coated components 702 may include, or may be formed of, a conductive material such as a metal or metal alloy. The one or more dielectrically-coated components 702 may be coated with and/or encapsulated within one or more dielectric materials using a potting process, an underfill process, an encapsulation process, or the like. By way of example, the one or more dielectrically-coated components 702 may include one or more hardware elements, such as one or more nuts, bolts, screws, pins, washers, or the like. In some embodiments, the one or more dielectrically-coated components 702 may include a swivel joint 704 coupled to a least one of the following: a first-X-axis connecting rod 312, a second-X-axis connecting rod 328, a second-Z-axis connecting rod 336, or an interlock connecting rod 364.

Referring further to FIG. 7A, in some embodiments, the one or more dielectrically-coated components 702 may include at least one of: a connecting plate 706, a mounting platform 708, or a circuit board 710. The control lever assembly 202 may be coupled to control console 64 at least in part by a connecting plate 706. The first-axis control lever assembly 210 may be coupled to the connecting plate 706, for example, at least in part by the first-X-axis pivot point 308, and/or by coupling hardware disposed about and/or that defines a portion of the first-X-axis pivot point 308. The one or more position sensors 302 may be mounted to the mounting platform 708. The mounting platform 708 may be coupled to the connecting plate 706, such as to a bottom side of the connecting plate 706. The circuit board 710 may be coupled to the connecting plate 706, such as to a bottom side of the connecting plate 706.

Referring, for example, to FIGS. 7B and 7C, in some embodiments, a control input apparatus 66 may include a connecting plate 706 formed of, or that includes, a dielectric component 700 or a dielectrically-coated component 702. In some embodiments, a control input apparatus 66 may include a component housing 712 formed of, or that includes, a dielectric component 700 or a dielectrically-coated component 702. The component housing 712 may house one or more position sensors 302. Additionally, or in the alternative, the component housing 712 may house, and/or may be coupled to a circuit board 710.

Example dielectric materials include one or more thermoplastic materials, such as thermoplastic polymer resins. One suitable thermoplastic material may include polyoxymethylene (POM), such as polyoxymethylene copolymers (POM-C), polyoxymethylene homopolymers (POM-H), as well as combinations of these. POM-C may sometimes be referred to as an acetal copolymer. POM-H may sometimes be referred to as an acetal homopolymer. In addition or in the alternative to POM, further suitable thermoplastic material may include poly(bisphenol A carbonate), poly(1,4-butadiene), poly(1-butene), poly(butyl methacrylate), poly(caprolactam), poly(caprolactone), poly(2-chloro-p-xylylene), poly(2-chlorostyrene), poly(4-chlorostyrene), poly(chlorotrifluoroethylene), poly(cyclohexyl methacrylate), poly(2,6-dimethyl-p-phenylene oxide), poly(2,6-diphenyl-p-phenylene oxide), poly(ethyl methacrylate), poly(ethylene terephthalate), poly(ethylene), poly(isobutene), poly(isobutyl methacrylate), poly(isobutylethylene), poly(methyl methacrylate), poly(2-methylstyrene), poly(4-methylstyrene), poly(1,4-phenyl ether), poly(propylene glycol), poly(propylene), poly(p-xylene), poly(thio-1,4-phenylene), poly(α-methylstyrene), poly(tetramethylene terephthalate), polyhexamethylene adipamide, polyhexamethylene sebacamide, polystyrene, polytetrafluoroethylene, polytetrahydrofuran, poly(vinyl acetate), polyvinyl fluoride, polyvinylidene chloride, polyvinylidene fluoride, as well as combinations of these.

Example dielectric materials may include one or more filler materials, such as glass (e.g., $SiO_2$), ceramics, silicate materials, calcium carbonate materials, calcium silicate materials, or carbon fiber materials, as well as combinations of these. Glass fillers may include one or more silicate glass materials and/or one or more non-silicate glass materials. Example silicate materials may include mica and/or wollastonite. The one or more filler materials may be embedded in a matrix of one or more thermoplastic materials. One example dielectric material may include filled-POM, such as glass-filled POM.

A dielectric material may be described with reference to a relative permittivity, $\varepsilon_r$. The relative permittivity of a dielectric material has the following relationship: $\varepsilon_r = \varepsilon/\varepsilon_0$, where $\varepsilon$ refers to the absolute permittivity of the dielectric material, and $\varepsilon_0$ refers to the permittivity of a vacuum. A material with a high relative permittivity polarizes more in response to an applied electric field than a material with a low relative permittivity, thereby storing more energy in the material. A dielectric material may have a relative permittivity of from about 2.0 to about 4.0, such as from about 2.1 to about 2.5, such as from about 2.5 to about 2.9, such as from about 2.9 to about 3.5, such as from about 3.5 to about 4.0.

Referring further to FIGS. 7A-7C, in some embodiments, a control input apparatus 66 may include one or more dielectric components 700 that define a dielectric gap (G). Additionally, or in the alternative, referring by way of example to FIGS. 7A and 7C, in some embodiments, a control input apparatus 66 may include an operator touchpoint 714 that defines a dielectric touchpoint separation length (T). In some embodiments, a control input apparatus 66 may be described with reference to an effective dielectric isolation distance. As used herein, the term "effective dielectric isolation distance" refers to a sum of a dielectric gap (G) and a dielectric separation length (T) exhibited by the control input apparatus 66. In some embodiments, the effective dielectric isolation distance may be from 1 to 9 inches, such as from 1 to 6 inches, such as from 1 to 3 inches, such as from 3 inches to 6 inches, such as from 4 to 8 inches, or such as from 5 to 9 inches.

As used herein, the term "dielectric gap" refers to a linear distance defined by one or more dielectric components 700 that separate a first electrically conductive component from a second electrically conductive component. The dielectric gap (G) may be determined as between a first electrically conductive component and a second electrically conductive component representing a nearest electrically conductive component that is separated from the first electrically conductive component by the one or more dielectric components 700. The dielectric gap (G) may be defined by a control lever 300. For example, as shown in FIG. 7A, a dielectric gap (G) may be defined by the first-axis control lever assembly 210. Additionally, or in the alternative, a dielectric gap (G) may be defined by at least one of: a first-X-axis connecting rod 312, a second-X-axis connecting rod 328, a second-Z-axis connecting rod 336, or an interlock connecting rod 364. In some embodiments, the dielectric gap (G) may be from 1 to 6 inches, such as from 1 to 3 inches, such as from 3 inches to 6 inches, such as from 3 to 5 inches, such as from 3 to 4 inches, such as from 4 to 6 inches, or such as from 5 to 6 inches.

As used herein, the term "dielectric touchpoint separation length" refers to a length of a surface between an operator touchpoint and a nearest electrically conductive component. In some embodiments, the dielectric touchpoint separation length (T) may be from 1 to 6 inches, such as from 1 to 2 inches, or such as from 2 to 4 inches, or such as from 2 to 5 inches, or such as from 3 to 6 inches. In some embodiments, the operator touchpoint 714 may include a connecting plate 706. Additionally, or in the alternative, the operator touchpoint 714 may include a dashboard 716. The connecting plate 706 and/or dashboard 716 may include a dielectric component 700 and/or may be formed of a dielectric material. The dielectric touchpoint separation length (T) may be defined between the connecting plate and a mounting platform 708, or between the dashboard 716 and the mounting platform 708. The mounting platform 708 may be formed of a metal or metal alloy.

Referring further to FIGS. 7A-7C, in some embodiments, a control input apparatus 66 may include one or more dielectric components 700 that define a dielectric surface length (S). As used herein, the term "dielectric surface length" refers to a length of a surface defined by one or more dielectric components 700 that separates a first electrically conductive component from a second electrically conductive component. The dielectric surface length (S) may be determined as between a first electrically conductive component and a second electrically conductive component representing a nearest electrically conductive component to the first electrically conductive component. The dielectric surface length (S) may be defined by a control lever 300. For example, as shown in FIG. 7A, a dielectric surface length (S) may be defined by the first-axis control lever assembly 210. Additionally, or in the alternative, a dielectric surface length (S) may be defined by at least one of: a first-X-axis connecting rod 312, a second-X-axis connecting rod 328, a second-Z-axis connecting rod 336, or an interlock connecting rod 364. In some embodiments, the dielectric surface length (S) may be from 4 inches to 9 inches, such as from 4 to 6 inches, or such as from 6 to 9 inches.

Referring now to FIGS. 7D-7E, in some embodiments, a control input apparatus 66 may include one or more dielectric components 700 that have one or more dielectric flanges 718. The one or more dielectric flanges 718 may be formed of a dielectric material. The one or more dielectric flanges 718 may be integrally formed with a dielectric component 700. By way of example, as shown in FIGS. 7D and 7F, a control lever 300, such as a first-axis control lever assembly 210, may include one or more dielectric flanges 718. Additionally, or in the alternative, as shown in FIGS. 7E, a connecting rod may include one or more dielectric flanges 718. For example, at least one of the following may include one or more dielectric flanges 718: a first-X-axis connecting rod 312, a second-X-axis connecting rod 328, a second-Z-axis connecting rod 336, or an interlock connecting rod 364. As shown, the one or more dielectric flanges 718 may be disposed about a proximal portion of a dielectric component 700, a distal portion of a dielectric component 700, and/or a medial portion of a dielectric component 700.

Referring now to FIGS. 8A and 8B, a control input apparatus 66 may include one or more computing devices 800. The computing device 800 may include a circuit board 802, such as a printed circuit board. The circuit board 802 may include a plurality of electronic components 804 coupled thereto. As shown in FIGS. 8A and 8B, at least some of the plurality of electronic components 804 may be housed within a shroud 806. The shroud 806 may be formed of an electrically conductive material, such as a metal or metal alloy, such as a copper or copper alloy. The computing device 800 may include a power supply 808, at least one processor 810, and at least one memory device 812. As shown, the power supply 808, the at least one processor 810, and/or the at least one memory device 812 may be housed within the shroud 806.

Referring to FIG. 8B, circuit boards 802 are further described. A circuit board 802 may include a laminated sandwich structure that has a series of alternating conductive layers 814 and insulating layers 816. The presently disclosed computing devices 800 and/or circuit boards 802 may include features that enhance performance of the computing device 800, including performance in and around electromagnetic fields such as those associated with electrical power transmission lines. In some embodiments, the computing devices 800 and/or circuit boards 802 may allow the computing device 800 to reliably transmit and/or receive communications in and around such electromagnetic fields, for example, using a CAN communication protocol. In some embodiments, the presently disclosed circuit boards 802 may reduce capacitive coupling. Additionally, or in the alternative, the computing devices 800 and/or circuit boards 802 may provide an improved transient response. Additionally, or in the alternative, the computing devices 800 and/or circuit boards 802 may provide an improved ripple rejection ratio. Additionally, or in the alternative, the computing devices 800 and/or circuit boards 802 suppress noise coupled into the circuit board 802, such as noise from input and/or output wiring.

In some embodiments, the conductive layers 814 of the circuit board 802 may include a first outer layer 818, such as a top layer, a second outer layer 820, such as a bottom layer 820, and a plurality of intermediate layers 822. The first outer layer 818 and/or the second outer layer may be, or may function as, a ground shield for the plurality of intermediate layers 822. The first outer layer 818 and the second outer layer 820 may include or may be configured as a ground plane (GND). The ground plane (GND) of the first outer layer 818 and the second outer layer 820 may shield the circuit board 802, the conductive layers 814 of the circuit board 802, and/or the electronic components 804 coupled to the circuit board 802, from external electromagnetic fields. Additionally, or in the alternative, the ground plane (GND) of the first outer layer 818 and the second outer layer 820 may inhibit conductive layers 814 of the circuit board and/or electronic components 804 coupled to the circuit board 802 from coupling to an external electromagnetic field. In some embodiments, the ground plane (GND) of the first outer layer 818 and the second outer layer 820 may suppress noise coupled into the circuit board 802, such as noise from input and/or output wiring, over a frequency range of from 2 to 800 MHz at 100 Ohms. In some embodiments, the circuit board 802 may include a voltage input filtering element, and the combination of the voltage input filtering element with the first outer layer 818 and the second outer layer 820 being configured as, or including, a ground plane (GND) may suppress noise coupled into the circuit board 802, such as noise from input and/or output wiring, over a frequency range of from 2 to 800 MHz at 100 Ohms.

In some embodiments, the circuit board 802 may include from 4 to 10 conductive layers 814, such as from 4 to 8 conductive layers 814, or such as from 5 to 7 conductive layers 814. For example, the circuit board 802 may include a first outer layer 818, a second outer layer 820, and from 2 to 8 intermediate layers 822, such as from 2 to 6 intermediate layers 822, or such as from 3 to 5 intermediate layers 822. The conductive layers 814 of the circuit board 802 may be separated by an insulating layer 816.

In some embodiments, the plurality of insulating layers 816 may include one or more thin insulating layers 824 and one or more thick insulating layers 826. As shown in FIG. 8B, a thick insulating layer 826 may be located at a middle position of the circuit board 802. One or more thin insulating layers 824 may be located between the first outer layer 818 and a thick insulating layer 826, and/or between the second outer layer 820 and the thick insulating layer 826. A thin insulating layer may have a depth of from 50 to 300 micrometers (μm), such as from 100 to 250 μm, such as from 100 to 150 μm, such as from 115 to 135 μm, such as from 150 to 250 μm, or such as from 180 to 220 μm. A thick insulating layer 826 may have a depth of from 400 to 1000 μm, such as from 500 to 900 μm, such as from 500 to 600 μm, such as from 700 to 900 μm, or such as from 800 to 900 μm.

A thin insulating layer 824 located in the circuit board 802 as presently disclosed may reduce inductance and/or may increase capacitance of one or more conductive layers adjacent to the thin insulating layer 824. Additionally, or in the alternative, a thin insulating layer 824 located in the circuit board 802 as presently disclosed may reduce magnetic loop areas formed between a conductive layer 814 and a ground plane (e.g., the first outer layer 818 or the second outer layer 820). A thick insulating layer 826 located in the circuit board as presently disclosed may reduce crosstalk between one or more conductive layers 814 located on opposite sides of the thick insulating layer 826.

The circuit board 802 may include a communication interface. The communication interface may include a CAN transceiver. The communication interface may be at least partially surrounded by an input grounding node (GNDIN). The input grounding node (GNDIN) may be provided in addition to the first outer layer 818 and the second outer layer 820 being configured as, or including, a ground plane (GND). The input grounding node (GNDIN) may shield the communication interface from external electromagnetic fields and/or from electromagnetic fields associated with other regions of the circuit board 802.

Referring now to FIG. 9, computing systems 900 for an aerial lift system 10 are described. The computing system 900 may include at least one computing device 800. As shown, the one or more computing devices 800 may be included as part of a control input apparatus 66. Additionally, or in the alternative, a computing device 800 may be provided separately from a control input apparatus 66, including locally or remotely with respect to the control input apparatus 66.

A computing device 800 may include at least one processor 810 and at least one memory device 812. The at least one processor 810 may include a microprocessor, microcontroller, integrated circuit, logic device, and/or other suitable processing device. The at least one processor 810 may include at least one CAN controller. The at least one memory devices 812 may include one or more computer-readable media, such as non-transitory computer-readable media.

As used herein, the terms "computer-readable media" and "non-transitory computer-readable media" refer to any and all forms of computer-readable media except for a transitory, propagating signal. The computer-readable media may include volatile and/or nonvolatile media, removable and/or nonremovable media, media readable by a database, as well as combinations of these. For example, computer-readable media may include (but is not limited to): RAM, ROM, EEPROM, flash memory or other memory technology, CD-ROM, digital versatile discs (DVD), holographic media or other optical disc storage, magnetic cassettes, magnetic tape, magnetic disk storage, or other magnetic storage devices, as well as combinations of these. Computer-readable media may store data temporarily or permanently. However, unless explicitly specified otherwise, the term "computer-readable media" should not be construed to include physical, but transitory, forms of propagating signal transmissions, such as: radio waves in a transitory, propagating state, electrical signals in a transitory, propagating state, or light pulses in a transitory, propagating state.

The at least one memory device 812 may store information accessible by the at least one processor 810, such as instructions, data structures, program modules, and other data representations. The at least one memory device 812 may include computer-executable instructions 902 that can be executed by the at least one processor 810. The instructions 902, when executed by the at least one processor 810 may cause the at least one processor 810 to perform operations, including operations associated with control inputs to a control input apparatus 66, such as controlling and/or operating an aerial lift system 10 and/or performing one or more auxiliary operations associated with the aerial lift system 10, one or more of the auxiliary systems 20, and/or the control input apparatus 66. The at least one memory device 812 may store data 904 accessible by the at least one processor 810. The data 904 may include instructions, data structures, program modules, and other data representations. The data 904 may include current or real-time data 904, past data 904, or a combination thereof. The data 904 may be stored in a data library 906. As examples, the data 904 may include data 904 associated with or generated by a control input apparatus 66, including data 904 associated with or generated by operations of the control input apparatus 66 and/or control inputs to the control input apparatus 66, such as data 904 associated with controlling and/or operating an aerial lift system 10 and/or performing one or more auxiliary operations associated with the aerial lift system 10, one or more of the auxiliary systems 20, and/or the control input apparatus 66. The data 904 may also include other data sets, parameters, outputs, information, associated with the control input apparatus 66 and/or operations thereof.

The at least one memory device 812 may include one or more modules 908 configured to perform operations associated with the control input apparatus 66. The one or more modules may include and/or may be referenced by computer-executable instructions 902 that can be executed by the at least one processor 810. By way of example, at least one module 908 may be associated with one or more features of an interlock system 350, such as an electrical interlock 354. Additionally, or in the alternative, at least one module 908 may be associated with one or more features of a control input modulator 400. Additionally, or in the alternative, at least one module 908 may be associated with a movement curve 600 for a movement modality of a control lever assembly 202 and/or a control input element 208.

The at least one computing device 800 may include a communication interface 910. The communication interface 910 may be configured for communications with a communication network 912 via wired or wireless communication lines 914. The communication interface may include a CAN transceiver. The communication interface may be communicatively coupled to the at least one processor 810, such as to the CAN controller.

The communication interface 910 may include any suitable components for interfacing with one or more network (s), including for example, transmitters, receivers, ports, controllers, antennas, and/or other suitable components. The communication interface 910 may allow the at least one computing device 800 to communicate with various nodes on the communication network 912, such as nodes associated with the CAN controller and/or the CAN transceiver, and/or such as nodes associated with one or more boom actuators 26. The communication network 912 may include, for example, a local area network (LAN), a wide area network (WAN), SATCOM network, VHF network, a HF network, a Wi-Fi network, a WiMAX network, a gatelink network, a CAN network, and/or any other suitable communication network 912 for transmitting messages to and/or from the at least one computing device 800 across the communication lines 914. The communication lines 914 of communication network 912 may include a data bus, such as a CAN bus, or a combination of wired and/or wireless communication links.

The communication interface 910 may additionally or alternatively allow the at least one computing device 800 to communicate with a user interface 916 and/or with a management system 918. The user interface 916 may include one or more user input/output devices to allow a user to interact with the at least one computing device 800. The management system 918 may be configured to interact with the at least one computing device 800 in connection with enterprise-level operations pertaining to the aerial lift system 10 and/or control input apparatus 66. Such enterprise level operations may include transmitting data from the management system 918 to the at least one computing device 800 and/or transmitting data from the at least one computing device 800 to the management system 918.

The management system 918 may include a server 920 and/or a data warehouse 922. As an example, at least a portion of the data 904 may be stored in the data warehouse 922. The server 920 may be configured to transmit data 904 from the data warehouse 922 to the at least one computing device 800, and/or to receive data 904 from the at least one computing device 800 and to store the received data 904 in the data warehouse 922 for further purposes. The server 920 and/or the data warehouse 922 may be implemented as part of a computing system 900 and/or as part of the management system 918.

Referring now to FIG. 10, methods of operating an aerial lift system 10 are described. Methods of operating an aerial lift system 10 may include methods of operating a control input apparatus 66 and/or methods of actuating an aerial lift actuator 26. A method may include any one or more operations presently disclosed herein. The one or more operations may be performed at least in part by a computing device that includes at least one processor and at least one memory device. A method and/or one or more operations may be embodied by a computer-readable medium. The computer-readable medium may include computer-executable instructions, which when executed by at least one processor, cause the at least one processor to perform one or more operations. The method may include the one or more operations.

As shown in FIG. 10, a method 1000 may include, at block 1002, determining an interlock indication from an interlock sensor 356. The interlock indication may indicate a position and/or movement with respect to a control input element 208 being actuated at least to an actuation threshold position (A$_T$) 408 located between a non-actuated position 404 and a fully-actuated position 406. At block 1004, the method 1000 may include determining a position indication from at least one position sensor 302 comprising a Hall effect sensor 504. The position indication may indicate a position and/or a movement with respect to one or more movement modalities of a control lever assembly 202 that includes at least one control lever 300. At block 1006, the method 1000 may include providing a control input based at least in part on the position indication from the at least one position sensor 302. The control input may be configured to control one or more boom actuators 26 of an aerial lift system 10. In some embodiments, the control input may be provided when the control input element 208 remains actuated at least to the actuation threshold position (A$_T$) 408. Additionally, or in the alternative, the control input may include a command value, and the command value may be modulated based at least in part on the position and/or movement with respect to the control input element 208 indicated by the interlock indication from the interlock sensor 356.

Further aspects of the present disclosure are provided by the following clauses:

A control input apparatus for an aerial lift system, the control input apparatus comprising: a control lever assembly comprising at least one control lever configured to move according to one or more movement modalities, and at least one position sensor configured to indicate a position and/or a movement with respect to the one or more movement modalities.

The control input apparatus of any clause herein, wherein the at least one position sensor comprises a Hall effect sensor.

A control input apparatus for operating an aerial lift system, the control input apparatus comprising: a control lever assembly comprising a control lever and a position sensor, the position sensor configured to indicate a position and/or a movement of the control lever; a control input element actuatable from a non-actuated position to a fully-actuated position; an interlock sensor, the interlock sensor configured to release an interlock corresponding to the control lever assembly upon the control input element being actuated at least to an actuation threshold position located between the non-actuated position and the fully-actuated position; wherein the control input apparatus is configured to provide a control input corresponding to the position and/or the movement of the control lever when the control input element remains actuated at least to the actuation threshold position.

A control input apparatus for operating an aerial lift system, the control input apparatus comprising: a control lever assembly comprising a control lever and a first position sensor, the first position sensor configured to indicate a position and/or a movement of the control lever; and a control input modulator comprising a control input element and a second position sensor, the second position sensor configured to indicate a position and/or a movement of the control input modulator; wherein the control input apparatus is configured to provide a control input corresponding to the position and/or the movement of the control lever indicated by the first position sensor; and wherein the control input comprises a command value, and wherein the control input apparatus is configured to modulate the command value based at least in part on a position and/or a movement of the control input element indicated by the second position sensor.

A control input apparatus for operating an aerial lift system, the control input apparatus comprising: a control lever assembly comprising a control lever and a position sensor, the position sensor comprising at least one position sensing element and at least one force metering element; wherein the control lever is movable according to one or more movement modalities, the one or more movement modalities respectively comprising a movement curve, wherein the at least one force metering element imparts a force profile to the movement curve, the force profile comprising a relationship between a position along the movement curve and a force associated with holding the position along the movement curve; wherein the movement curve comprises an actuation curve and a return curve, wherein for at least a portion of the actuation curve and at least a portion of the return curve, a first force corresponding to the actuation curve at a given position is greater than a second force corresponding to the return curve at the given position.

A control input apparatus for an aerial lift system, the control input apparatus comprising: a control lever assembly comprising at least one control lever configured to move according to one or more movement modalities, and at least one position sensor configured to indicate a position and/or a movement with respect to the one or more movement modalities, the at least one position sensor comprising a Hall effect sensor; wherein the control lever assembly comprises a plurality of electrically conductive components, the plurality of electrically conductive components comprising the Hall effect sensor; wherein the control lever assembly comprises one or more dielectric components, wherein the one or more dielectric components define a dielectric gap between a first one of the plurality of electrically conductive components and a second one of the plurality of electrically conductive components; wherein the control input apparatus exhibits a high electrical resistance, the high electrical resistance comprising exhibiting a current of 0.4 milliampere or less when exposed to 40 kV AC for 3 minutes in accordance with an electrical resistance test for the control input apparatus.

A control input apparatus for an aerial lift system, the control input apparatus comprising: a control lever assembly comprising a control lever and a position sensor, the position sensor configured to indicate a position and/or a movement of the control lever; and a computing device comprising a circuit board and a plurality of electronic components coupled to the circuit board, the plurality of electronic components comprising at least one processor, at least one memory device, a power supply, and a communication interface; and a shroud comprising an electrically conductive material, wherein one or more of the plurality of electronic components are housed within the shroud; wherein the computing device is configured to transmit, at least in part by the communication interface, a control input corresponding to the position and/or the movement of the control lever.

A control input apparatus comprising a combination of any one or more of the preceding clauses.

An aerial lift system, comprising: a base; a boom assembly coupled to the base; and a platform assembly coupled to the boom assembly; wherein the platform assembly comprises at least one control input apparatus configured according to any one or more of the preceding clauses.

A computer-readable medium comprising computer-executable instructions, which when executed by at least one processor associated with a control input apparatus for an aerial lift system, cause the at least one processor to perform operations associated with at least one control input apparatus configured according to any one or more of the preceding clauses.

A method of operating a control input apparatus, the method comprising performing one or more operations associated with at least one control input apparatus configured according to any one or more of the preceding clauses.

A method of operating an aerial lift system, the method comprising performing one or more operations associated with the aerial lift system and/or at least one control input apparatus configured according to any one or more of the preceding clauses.

Although the presently disclosed subject matter has been described with reference to the embodiments illustrated in the attached drawing figures, it is noted that equivalents may be utilized and substitutions made herein without departing from the scope of the invention defined by the appended claims.

Accordingly, what is claimed as new and desired to be protected by Letters Patent includes the following:

1. A control system for operating an aerial lift system, the control system comprising:
    a control lever assembly comprising a control lever and at least one sensor and configured to control movement of at least one boom actuator of the aerial lift system when a control input is provided to the control lever,
    wherein the at least one sensor is configured to indicate at least a position of the control lever;
    a memory storing:
        a movement curve indicative of a relationship between the position of the control lever and operation of the at least one boom actuator according to the position of the control lever,
        wherein the movement curve comprises an actuation curve and a return curve,
        wherein for at least a portion of the actuation curve and at least a portion of the return curve, a first force corresponding to the actuation curve at a given position is greater than a second force corresponding to the return curve at the given position; and
        a strain threshold indicative of a maximum strain of a boom operable by the at least one boom actuator of the aerial lift system; and
    at least one processor configured to cause actuation of the at least one boom actuator based on the control input, the movement curve, and the strain threshold.

2. The control system of claim 1, further comprising:
    an interlock lever assembly comprising an interlock lever and at least one interlock sensor,
    wherein the at least one interlock sensor is configured to release an interlock based on an interlock lever position reaching at least an interlock threshold position.

3. The control system of claim 2, wherein the interlock restricts the operation of the at least one boom actuator when the interlock lever position is less than the interlock threshold position.

4. The control system of claim 3, wherein the interlock threshold position is between 20% and 80% of a movement range of the interlock lever.

5. The control system of claim 1, wherein the control lever assembly is disposed on an aerial platform of the aerial lift system.

6. The control system of claim 1,
    wherein the memory further stores an actuation threshold position, and
    wherein the actuation threshold position comprises a minimum actuation position of the control lever required to actuate the at least one boom actuator.

7. The control system of claim 1, further comprising:
    a first metering element and a second metering element, wherein a first force profile of the actuation curve is provided by the first metering element, and wherein a second force profile of the return curve is provided by the second metering element.

8. The control system of claim 1, wherein the control lever is configured to move according to a plurality of modalities, the plurality of modalities including three-directional linear movement, twist, and rotation.

9. The control system of claim 8, wherein each modality of the plurality of modalities comprises a corresponding movement curve and force profile.

10. One or more non-transitory computer-readable media storing computer-executable instructions that, when executed by at least one processor, performs a method of controlling operation of an aerial lift system, the method comprising:

receiving, from at least one sensor, a control input command for controlling movement of at least one boom actuator of the aerial lift system, wherein the control input command is indicative of a position of a control lever;

comparing the control input command to a movement curve indicative of a relationship between the position of the control lever and operation of the at least one boom actuator according to the position of the control lever, wherein the movement curve comprises an actuation curve and a return curve, and wherein for at least a portion of the actuation curve and at least a portion of the return curve, a first force corresponding to the actuation curve at a given position is greater than a second force corresponding to the return curve at the given position;

comparing the control input command to a strain threshold associated with a maximum strain of a boom operable by the at least one boom actuator of the aerial lift system;

determining a control output command based on the comparing of the control input command to the movement curve and the strain threshold; and actuating the at least one boom actuator by the control output command.

11. The media of claim 10, wherein the method further comprises:

receiving an interlock control command from an interlock sensor, wherein the interlock control command is indicative of an interlock lever position; and releasing an interlock based on the interlock lever position reaching at least an interlock threshold position.

12. The media of claim 11, wherein the interlock restricts the operation of the at least one boom actuator when the interlock lever position is less than the interlock threshold position.

13. The media of claim 10, wherein the method further comprises:

comparing the control input command to an actuation threshold position, wherein the actuation threshold position comprises a minimum actuation position of the control lever required to actuate the at least one boom actuator; and actuating the at least one boom actuator by the control output command if the control input command is greater than the actuation threshold position.

14. The media of claim 10, wherein the control lever is configured to move according to a plurality of modalities, the plurality of modalities including three-directional linear movement, twist, and rotation.

15. The media of claim 14, wherein each modality of the plurality of modalities comprises a corresponding movement curve and force profile.

16. The media of claim 10, wherein the method further comprises:

providing a first force profile of the actuation curve by a first metering element, and providing a second force profile of the return curve by a second metering element.

17. A method of controlling operation of an aerial lift system, the method comprising:

receiving, from at least one sensor, a control input command for controlling movement of at least one boom actuator of the aerial lift system, wherein the control input command is indicative of a position of a control lever;

comparing the control input command to a movement curve indicative of a relationship between the position of the control lever and operation of the at least one boom actuator according to the position of the control lever, wherein the movement curve comprises an actuation curve and a return curve, and wherein for at least a portion of the actuation curve and at least a portion of the return curve, a first force corresponding to the actuation curve at a given position is greater than a second force corresponding to the return curve at the given position;

comparing the control input command to a strain threshold associated with a maximum strain of a boom operable by the at least one boom actuator of the aerial lift system;

determining a control output command based on the comparing of the control input command to the movement curve and the strain threshold; and actuating the at least one boom actuator by the control output command.

18. The method of claim 17, further comprising:

receiving an interlock control command from an interlock sensor, wherein the interlock control command is indicative of an interlock lever position; and releasing an interlock based on the interlock lever position reaching at least an interlock threshold position, wherein the interlock restricts the operation of the at least one boom actuator when the interlock lever position is less than the interlock threshold position.

19. The method of claim 17, further comprising:

comparing the control input command to an actuation threshold position, wherein the actuation threshold position comprises a minimum actuation position of the control lever required to actuate the at least one boom actuator; and actuating the at least one boom actuator by the control output command if the control input command is greater than the actuation threshold position.

20. The method of claim 17, wherein the control lever is configured to move according to a plurality of modalities, the plurality of modalities including three-directional linear movement, twist, and rotation, and wherein each modality of the plurality of modalities comprises a corresponding movement curve and force profile.

* * * * *